(12) United States Patent
Shitamoto et al.

(10) Patent No.: US 10,422,647 B2
(45) Date of Patent: Sep. 24, 2019

(54) MOVING ROUTE CREATING METHOD AND MOVING ROUTE CREATING DEVICE

(71) Applicant: MURATA MACHINERY, LTD., Kyoto-shi, Kyoto (JP)

(72) Inventors: Hideo Shitamoto, Kyoto (JP); Shoji Tanaka, Kyoto (JP); Hiroaki Ohmatsu, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 143 days.

(21) Appl. No.: 15/622,102

(22) Filed: Jun. 14, 2017

(65) Prior Publication Data

US 2018/0017395 A1 Jan. 18, 2018

(30) Foreign Application Priority Data

Jul. 12, 2016 (JP) ................................ 2016-137574

(51) Int. Cl.
*G01C 21/26* (2006.01)
*G05D 1/02* (2006.01)
*G01C 21/32* (2006.01)

(52) U.S. Cl.
CPC ............ *G01C 21/26* (2013.01); *G01C 21/32* (2013.01); *G05D 1/024* (2013.01); *G05D 1/0214* (2013.01); *G05D 1/0223* (2013.01)

(58) Field of Classification Search
CPC ...... G01C 21/26; G01C 21/32; G05D 1/0214; G05D 1/024; G05D 1/0223
See application file for complete search history.

(56) References Cited

U.S. PATENT DOCUMENTS

| 9,944,317 | B2* | 4/2018 | Lee | B62D 15/0265 |
| 2008/0119993 | A1* | 5/2008 | Breed | B60R 19/205 |
| | | | | 701/46 |
| 2008/0238718 | A1* | 10/2008 | Jung | B62D 15/025 |
| | | | | 340/901 |
| 2012/0062745 | A1* | 3/2012 | Han | B62D 15/029 |
| | | | | 348/148 |
| 2012/0271540 | A1* | 10/2012 | Miksa | G01C 21/30 |
| | | | | 701/409 |
| 2013/0085975 | A1* | 4/2013 | Wellhoefer | B60R 21/0134 |
| | | | | 706/46 |
| 2013/0226431 | A1* | 8/2013 | Lu | B60W 50/0098 |
| | | | | 701/96 |
| 2014/0035738 | A1* | 2/2014 | Kim | G08G 1/167 |
| | | | | 340/435 |

(Continued)

FOREIGN PATENT DOCUMENTS

JP 2011-107984 A 6/2011

*Primary Examiner* — Hussein Elchanti
(74) *Attorney, Agent, or Firm* — Keating & Bennett, LLP

(57) ABSTRACT

In a method and device for creating a moving route of a mobile body, a moving route that is appropriately shifted right or left with respect to a passage is created. The moving route creating method and device create a reference route on a passage present on an environment map representing an environment in which an autonomous mobile body moves, set a widthwise-shift attribute as an attribute region that is independent from the environment map, and create a traveling schedule for autonomous movement of the autonomous mobile body by shifting the reference route right or left based on the widthwise-shift attribute.

10 Claims, 25 Drawing Sheets

(56) References Cited

U.S. PATENT DOCUMENTS

2014/0063250 A1* 3/2014 Park .................. H04N 5/23206
348/148
2017/0371338 A1* 12/2017 Kamata .................. G05D 1/024

* cited by examiner

STRAIGHT TRAVELING
DIRECTION

EXPANSION REGION

MOVING ROUTE CREATING METHOD AND MOVING ROUTE CREATING DEVICE

CROSS REFERENCE TO RELATED APPLICATIONS

This application claims the benefit of priority to Japanese Patent Application No. 2016-137574 filed on Jul. 12, 2016. The entire contents of this application are hereby incorporated herein by reference.

BACKGROUND OF THE INVENTION

1. Field of the Invention

The present invention relates to a moving route creating method for creating a moving route of a mobile body that moves in a predetermined mobile environment, and a moving route creating device that creates the moving route.

2. Description of the Related Art

Conventionally, there have been known devices that search and create routes on which autonomous mobile bodies (for example, autonomous robots), which autonomously move in predetermined mobile environments, move. For example, Unexamined Japanese Patent Publication No. 2011-107984 discloses a system that, after deciding a reference route of an autonomous mobile body, shifts the reference route in a shift direction by a shift amount so as to create a moving route of the autonomous mobile body.

In this system, for example, when people keep to the right, a reference route is shifted to the right with respect to a center of a passage on which an autonomous mobile body moves, so as to create a moving route. As a result, the autonomous mobile body can be moved even when people exist near the moving route.

In the system that creates a moving route, a shift amount of a reference route is decided based on a distance between the reference route and an obstacle such as a wall on a passage. That is, the shift amount depends on a passage width present in a mobile environment of an autonomous mobile body. In this system, when a distance between a reference route and an obstacle is long, such as when the passage width is large, the amount of shift from the reference route is small. As a result, a plurality of autonomous mobile bodies that move in opposite directions from each other sometimes cannot be separated from or brought close to each other with a safe distance on the passage.

SUMMARY OF THE INVENTION

According to preferred embodiments of the present invention, moving routes are able to be created so as to be suitably shifted right or left with respect to a passage.

A plurality of preferred embodiments of the present invention will be described below. These preferred embodiments or features thereof are able to be combined in any way necessary or desirable.

A moving route creating method according to one aspect of a preferred embodiment of the present invention includes creating a reference route on a passage present on an environment map representing an environment in which an autonomous mobile body moves, the reference route being a route defining a reference on which the autonomous mobile body moves, and setting a widthwise-shift attribute as an attribute region that is independent from the environment map, the widthwise-shift attribute being an attribute that defines movement of the autonomous mobile body right or left from the reference route with respect to a moving direction; and creating a moving route along which the autonomous mobile body autonomously moves by shifting the reference route right or left based on the widthwise-shift attribute.

In the moving route creating method, the widthwise-shift attribute (the attribute region) to define the movement of the autonomous mobile body toward the right or left from the reference route is set independent from an environment map representing an environment in which the autonomous mobile body moves. That is, the widthwise-shift attribute is set as an attribute that is not influenced by a width of a passage indicated on the environment map.

Accordingly, for example, a moving route on which the autonomous mobile body is autonomously moved toward the right or left with respect to the passage is able to be appropriately created without being influenced by information indicated on the environment map such as a width of the passage on the environment map (the width of the passage present in the environment in which the autonomous mobile body moves).

The widthwise-shift attribute may include a shift percentage as a parameter. The shift percentage is a parameter representing a percentage of the right shift or the left shift from the reference route.

As a result, a shift amount of the reference route to the right or the left is able to be set to any value.

The step of creating the moving route may include generating a movable region defined by the reference route and a moving boundary line, the moving boundary line being a boundary line representing a boundary to which the autonomous mobile body is movable and being present on a side indicated by the widthwise-shift attribute with respect to the reference route; generating a widthwise-shift capability region by deleting, from the movable region, a side to be decided based on the shift percentage; and creating the moving route by executing a thinning process on the widthwise-shift capability region.

As a result, the moving route is able to be appropriately created by shifting the reference route by a percentage indicated by the shift percentage to a side indicated by the widthwise-shift attribute (right or left with respect to the reference route).

The step of generating the movable region may include generating an expansion region by expanding the reference route in a direction indicated by the widthwise-shift attribute in accordance with a Minkowski sum; and executing, when a region without the expansion region is present in a region where the expansion region is to be present in the passage present on the environment map, an interpolation process to interpolate the region without the expansion region with a predetermined region.

Accordingly, a movable region including all the regions that should be the movable regions is able to be appropriately set.

A moving route creating device according to another aspect of a preferred embodiment of the present invention includes a reference route creator, a storage, and a moving route generator. The reference route creator creates a reference route on a passage present on an environment map representing an environment in which an autonomous mobile body moves. The reference route is a route defining a reference on which the autonomous mobile body moves. The reference route may be an actual moving route of the autonomous mobile body, or may be a route drawn on the environment map using CAD or the like.

The storage stores an attribute map. The attribute map is map information that is independent from the environment map. In the attribute map, the widthwise-shift attribute is set as an attribute region. The widthwise-shift attribute is an that defines a movement of the autonomous mobile body right or left with respect to the reference route in a moving direction.

The moving route generator creates a moving route along which the autonomous mobile body autonomously moves by shifting the reference route right or left based on the widthwise-shift attribute.

In the moving route creating device, the storage stores the widthwise-shift attribute (an attribute region) to define movement of the autonomous mobile body right or left with respect to the reference route, as an attribute map independent from the environment map representing an environment in which the autonomous mobile body moves. That is, on the attribute map, the widthwise-shift attribute is set as an attribute that is not influenced by a passage width indicated on the environment map.

This configuration is able to appropriately create a moving route on which the autonomous mobile body is autonomously moved right or left with respect to a passage without being influenced by a passage width on the environment map (the passage width present in the environment in which the autonomous mobile body moves).

The moving route creating device may further include an attribute region setter. The attribute region setter has a display, a drawing generator, and an attribute region creator. The display displays at least a portion of the environment map. The drawing generator draws a region having a predetermined shape on at least the portion of the environment map displayed on the display. The attribute region creator associates the widthwise-shift attribute with the region having the predetermined shape drawn by the drawing generator so as to generate an attribute region.

As a result, while the environment map displayed on the display is being visually checked, a desired attribute region is able to be visually set at a desired position of the environment map.

The drawing generator of the attribute region setter may be capable of coloring the region having the predetermined shape. In this case, the attribute region creator calculates a shift percentage based on coloring density within the region having the predetermined shape. The shift percentage is a parameter representing a percentage of the right shift or the left shift from the reference route. The attribute region creator generates an attribute region by associating the widthwise-shift attribute including the shift percentage with the region having the predetermined shape.

The drawing generator is capable of coloring the region having the predetermined shape representing the attribute region. The attribute region creator calculates a shift percentage based on the coloring density within the region, so as to be capable of visually setting a shift percentage with which an amount of right or left shift from the reference route is able to be set to any value.

The moving route obtained by appropriately shifting the reference passage right or left is able to be created without being influenced by a passage width on the environment map.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

One example of an autonomous mobile body 1 including a moving route creating device 100 (described later) will be described.

Figure 1:
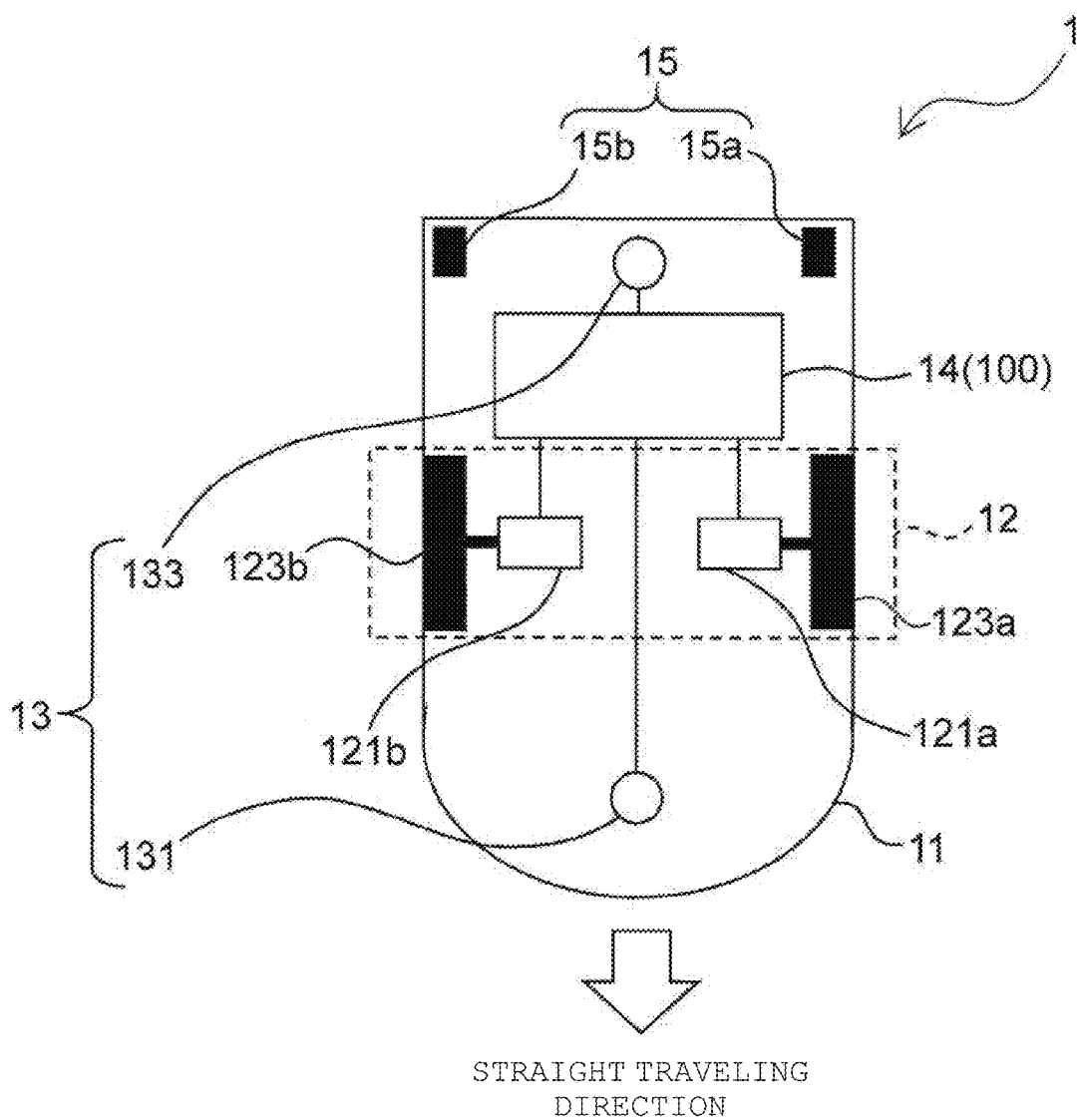
FIG. 1 is a diagram illustrating a configuration of an autonomous mobile body that includes a preferred embodiment of the present invention.

The autonomous mobile body 1 described below is, for example, a mobile body that can autonomously travel while reproducing a route provided by a user. First, a configuration of the autonomous mobile body 1 will be described with reference to FIG. 1. FIG. 1 is a diagram illustrating a configuration of the autonomous mobile body that includes a preferred embodiment of the present invention.

The autonomous mobile body 1 includes a main body 11. The main body 11 is, for example, a casing that defines the main body of the autonomous mobile body 1. In this preferred embodiment, a "self position", described later, is defined as a position (a coordinate) of a center of the main body 11 on an environment map M1 representing a mobile environment. Further, the term "self" means the main body 11 of the autonomous mobile body 1.

The autonomous mobile body 1 includes a mobile unit 12. The mobile unit 12 is, for example, a differential two-wheel mobile unit that moves the main body 11.

Specifically, the mobile unit 12 includes a pair of motors 121a and 121b. The pair of motors 121a and 121b preferably are electric motors, such as a servomotor or a brushless motor, provided to a bottom portion of the main body 11. The pair of motors 121a and 121b are electrically connected to a controller 14 (described later), and output rotary shafts of the motors are independently rotated at any rotation speed and with any torque based on a command from the controller 14.

The mobile unit 12 includes a pair of wheels 123a and 123b. The pair of wheels 123a and 123b partially contact with a floor surface (a moving surface) of the mobile environment, and are connected to the output rotary shafts of the pair of motors 121a and 121b, respectively. As a result, the wheels 123a and 123b are independently rotated by the motors 121a and 121b so as to move the main body 11.

The independent rotatability makes rotation speeds of the wheels 123a and 123b different from each other so that a posture of the main body 11 is able to be changed. On the other hand, when the rotation speeds of the pair of wheels 123a and 123b are equal to each other, the main body 11 is allowed to travel straight.

The output rotary shafts of the motors 121a and 121b are provided with encoders 125a and 125b (FIG. 2), respectively. The encoders 125a and 125b are, for example, incremental encoders that output pulse signals based on rotation amounts of the output rotary shafts of the motors 121a and 121b. As a result, a self position estimator 143 (described later) is able to estimate a position and/or a posture of the autonomous mobile body 1 (the main body 11) in a mobile environment based on the rotation amounts of the motors 121a and 121b, namely, rotation amounts of the wheels 123a and 123b.

The autonomous mobile body 1 includes a laser range sensor 13. The laser range sensor 13 is a laser range finder (LRF) that radially emits, for example, a laser beam pulse-oscillated by a laser oscillator to an obstacle and an object that are structures in a mobile environment (for example, a pillar, a shelf, and a wall disposed in the mobile environment), and receives reflection light reflected from the obstacle through a laser receiver so as to acquire information about the obstacle and the object.

The laser range sensor 13 includes a first laser range sensor 131 disposed on a front portion of the main body 11, and a second laser range sensor 133 disposed on a rear portion of the main body 11.

The first laser range sensor 131 radially generates a laser beam on a front side of the main body 11 in a right-left direction, so as to acquire information about obstacles or objects included within a circle with a radius of about 20 m from the first laser range sensor 131 as a center on the front side of the main body 11, for example.

On the other hand, the second laser range sensor 133 radially generates a laser beam toward a rear side of the main body 11 in the right-left direction, so as to acquire information about obstacles or objects included within a circle with a radius of about 5 m from the second laser range sensor 133 as a center on the rear side of the main body 11, for example.

Detectable distances of the laser range sensors are not limited to the above values, and thus are able be appropriately changed according to applications of the autonomous mobile body 1.

Furthermore, as the sensors that detect obstacles and objects, besides the laser range finder, a sensor that is able to measure a distance between obstacles or objects present around the main body 11 and the sensor (the main body 11) can be used. For example, a time-of-flight (TOF) camera can be used. A still another example of the sensors is a system that is able to operate a sensor that measures a one-dimensional or two-dimensional distance as a sensor that measures a two-dimensional or three-dimensional distance.

The autonomous mobile body 1 includes the controller 14. The controller 14 preferably is a computer system that includes a central processing unit (a CPU), a hard disc device, a solid state drive (an SSD), a read only memory (a ROM), a random access memory (a RAM), a storage device such as a storage media reading device, and an interface that performs signal conversion. The controller 14 controls respective components and functions of the autonomous mobile body 1. A configuration of the controller 14 will be described in detail later.

The autonomous mobile body 1 may further include an auxiliary wheel unit 15. The auxiliary wheel unit 15 includes two auxiliary wheels 15a and 15b. The two auxiliary wheels 15a and 15b are mounted so as to be rotatable independently. The provision of the auxiliary wheel unit 15 enables the autonomous mobile body 1 to move stably and smoothly.

Figure 2:
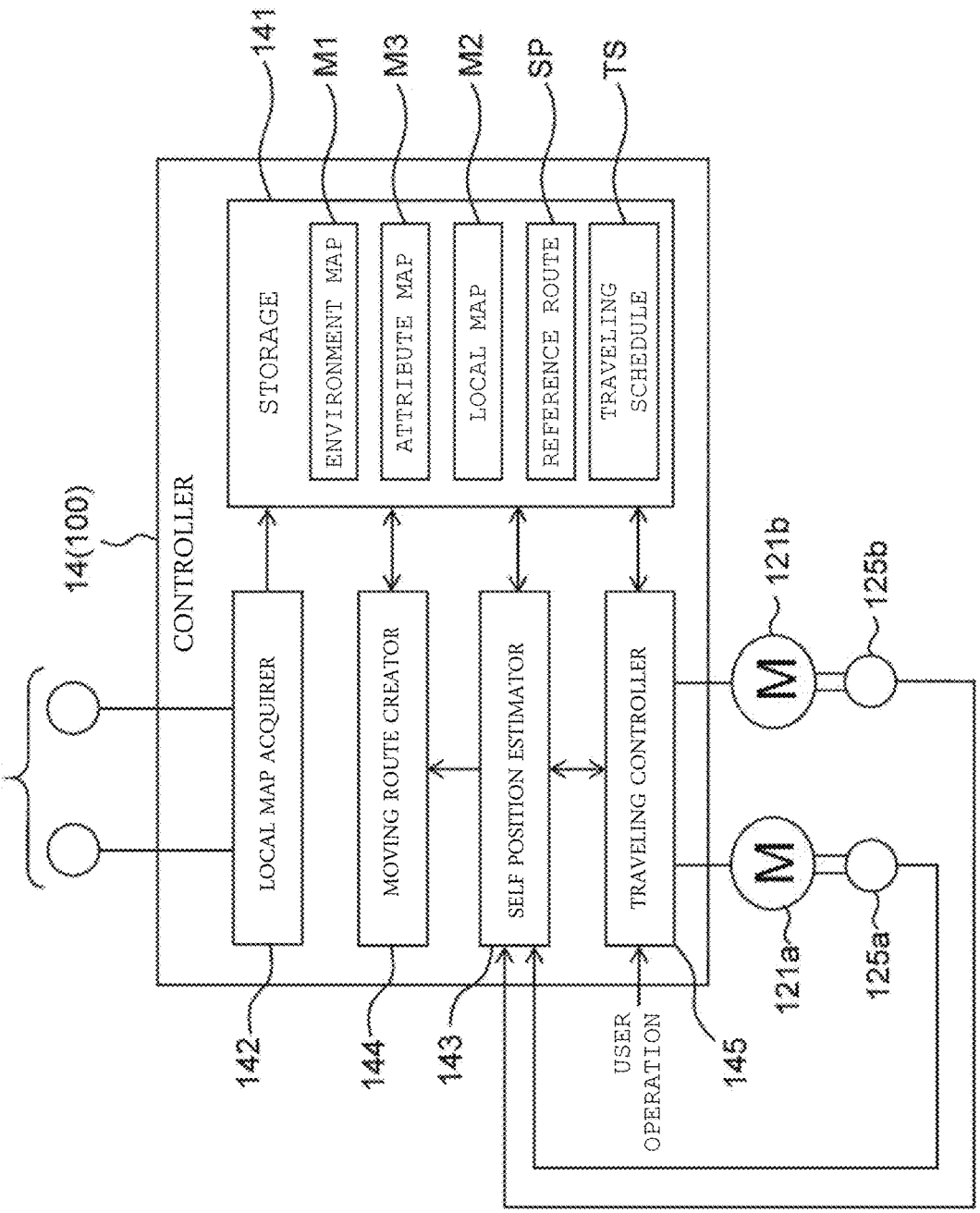
FIG. 2 is a diagram illustrating a configuration of a controller.

The configuration of the controller 14 will be described with reference to FIG. 2. FIG. 2 is a diagram illustrating the configuration of the controller. Some or all of functions of respective sections of the controller 14 described below may be realized as programs that are executable in a computer system. Further, the programs may be stored in the storage device of the computer system. Alternatively, some or all of the functions may be realized by custom ICs or other circuits or hardware.

The controller 14 includes a storage 141. The storage 141 is a portion of a storage region of the storage device in the computer system defining the controller 14. The storage 141 stores various pieces of information to be used to control the autonomous mobile body 1.

The controller 14 includes a local map acquirer 142. The local map acquirer 142 acquires a local map M2 based on a signal acquired from the laser range sensor 13. The local map M2 is map information within a predetermined range whose center is a position where the autonomous mobile body 1 is present in a mobile environment. In this preferred embodiment, the local map acquirer 142 acquires the local map M2 in the following manner.

First, a distance between the laser range sensor 13 and an object is calculated based on a time difference between timing at which the laser range sensor 13 emits a laser beam and timing at which the laser range sensor 13 (the laser receiver) receives a reflected light. Further, for example, a direction in which the object is present viewed from the main body 11 is able to be calculated based on an angle of a light receiving surface of the laser receiver at the time of reception of the reflected light.

Thereafter, a relative distance between the main body 11 and the object viewed from the main body 11, the relative distance calculated by the time difference, and the angle of the light receiving surface at the time of the reception of the reflected light are converted into coordinate values on a coordinate plane (a plane of a movement coordinate system) representing the mobile environment. As a result, the local map acquirer 142 is able to acquire map information representing the relative position of the object present around the autonomous mobile body 1 (the main body 11) with respect to the autonomous mobile body 1, as the local map M2.

For example, when the distance from the autonomous mobile body 1 to the object is calculated as R, and the angle of the light receiving surface of the laser range sensor 13 is $\alpha$ (a counterclockwise side of the angle represents a positive angle) with respect to a straight traveling direction (FIG. 1) of the autonomous mobile body 1, the relative position of the object with respect to the autonomous mobile body 1 can be calculated as ($R*\cos\alpha$, $R*\sin\alpha$) in a coordinate system in which a center of the laser range sensor 13 is an origin and the straight traveling direction of the autonomous mobile body 1 is an x direction (a horizontal direction).

The local map acquirer 142 stores the local map M2 acquired as described above in the storage 141.

Note that the local map acquirer 142 does not need to transform the angle $\alpha$ acquired by the laser range sensor 13 and the distance R from the autonomous mobile body 1 to the object into an orthogonal coordinate system in which the straight traveling direction of the autonomous mobile body 1 is the x direction (the horizontal direction).

The following description refers to a case where the orthogonal coordinate system is used as a coordinate system representing the local map M2 and the environment map M1, namely, a coordinate system representing a mobile environment (referred to as a movement coordinate system) for simple description.

The controller 14 includes the self position estimator 143. The self position estimator 143 estimates a position of the autonomous mobile body 1 (referred to as a self position) in a mobile environment and/or an angle (referred to as a posture) of the autonomous mobile body 1 with respect to a predetermined axis (for example, an X axis of a movement coordinate system (an X-Y coordinate system)) while the autonomous mobile body 1 is moving in the mobile environment.

The self position estimator 143 performs map matching between the local map M2 acquired by the local map acquirer 142 and the environment map M1 stored in the storage 141, so as to estimate a self position and/or a posture of autonomous mobile body 1.

Specifically, the self position estimator 143 first disposes the local map M2 at a position on the environment map M1 corresponding to a position of the autonomous mobile body 1 in the mobile environment calculated based on rotation amounts of the motors 121*a* and 121*b* (the wheels 123*a* and 123*b*) acquired by the encoders 125*a* and 125*b*.

The self position estimator 143 then rotates the local map M2 at that position by a posture (an angle) calculated based on the rotation amounts of the wheels 123*a* and 123*b*, and performs map matching between the environment map M1 and the local map M2.

Specifically, the self position estimator 143 first disposes the local map M2 at a plurality of positions on the environment map M1 within a predetermined range including the position and/or the posture estimated based on the rotation amounts of the wheels 123*a* and 123*b*. The self position estimator 143 then rotates the local map M2 at the plurality of positions, within a predetermined rotational angle range.

Thereafter, the self position estimator 143 estimates, among the plurality of disposing positions and the plurality of rotation angles, the disposing position and the rotation angle in and at which the local map M2 most exactly matches the environment map M1 as the self position and the posture. The estimation of the self position and/or the posture through the map matching is able to be performed by, for example, "likelihood calculation".

When the map matching is performed between the environment map M1 and the local map M2, a range is provided to the disposing position and the rotation angle of the local map M2. This cancels an error in estimation of a self position and/or a posture based on the rotation amounts of the wheels 123*a* and 123*b*, and an error in estimation of a self position and/or a posture in the map matching (caused mainly by errors included in the local map M2 and/or the environment map M1 acquired by the laser range sensor 13). As a result, a self position and/or a posture is able to be estimated accurately.

Further, the self position estimator 143 creates an environment map M1 representing an existence position of an object in a mobile environment (namely, an environment where the autonomous mobile body 1 moves).

For example, the self position estimator 143 disposes the local map M2, which is acquired at the time of the estimation of the self position, at the self position estimated when the autonomous mobile body 1 is moving in the manual mode, so as to create the environment map M1.

Specifically, for example, the self position estimator 143 estimates a self position and/or a posture of the autonomous mobile body 1 at predetermined time intervals (for example, a control cycle of the controller 14) while the autonomous mobile body 1 is moving in the manual mode. As a result, while the autonomous mobile body 1 is moving from a moving start position to a moving end position in the manual mode, a plurality of self positions are estimated, and local maps M2 corresponding to the plurality of self positions are acquired.

The self position estimator 143 disposes the corresponding local maps M2 on coordinates of the plurality of estimated self positions in a movement coordinate system, so as to be capable of creating an environment map M1. The self position estimator 143 stores the environment map M1 created in such a manner in the storage 141.

The controller 14 includes a moving route creator 144. The moving route creator 144 creates a traveling schedule TS (one example of a moving route) when the autonomous mobile body 1 autonomously moves in an autonomous mode. The moving route creator 144 moves a reference route SP right or left based on a setting value of the widthwise-shift attribute, described later, so as to create the traveling schedule TS.

The reference route SP is a reference route through which the autonomous mobile body 1 moves (when the autonomous mode (described later) is executed). For example, the reference route SP may be a route passing through the center of the route of the environment map M1. Alternatively, the reference route SP may be a route when the autonomous mobile body 1 is moved from a moving start position to a moving end position by a user's operation during execution of the manual mode.

Either of the routes are able to be appropriately determined as the reference route SP in accordance with, for example, applications of the autonomous mobile body 1.

The provision of the moving route creator 144 (or its function) enables the controller 14 to be the moving route creating device 100. A configuration and a function of the moving route creator 144 will be described later in detail.

The controller 14 includes a traveling controller 145. The traveling controller 145 controls the motors 121*a* and 121*b*. The traveling controller 145 is, for example, a motor driver that calculates control amounts of the motors 121*a* and 121*b*, and outputs driving power based on the control amounts to the motors 121*a* and 121*b*. The traveling controller 145 calculates control amounts of the motors 121*a* and 121*b* so that rotation amounts (rotation speeds) of the motors 121*a* and 121*b* per unit time input from the encoders 125*a* and 125*b* become desired rotation speeds (feedback control).

The traveling controller 145 is able to execute either of the autonomous mode and the manual mode through switching by a user. During the execution of the autonomous mode, the traveling controller 145 calculates, for example, control amounts of the motors 121*a* and 121*b*, based on a difference between passing points (subgoal points) indicated in the traveling schedule TS stored in the storage 141 and the self position and/or the posture estimated by the self position estimator 143. The traveling controller 145 then outputs driving power based on the calculated control amounts to the motors.

As a result, during the execution of the autonomous mode, the traveling controller 145 is able to autonomously move the autonomous mobile body 1 in accordance with the traveling schedule TS.

On the other hand, during the execution of the manual mode, the traveling controller 145 accepts, for example, a user's operation through an operation device such as a controller or a computer system communicable with the autonomous mobile body 1 in a wired or wireless manner or an operation handle (not illustrated) provided to the autonomous mobile body 1, so as to control the motors 121*a* and 121*b* based on the user's operation. As a result, the autonomous mobile body 1 is able to be moved by the user's operation.

Since the controller 14 has the above configuration, the controller 14 is able to move the autonomous mobile body 1 through the user's operation during the execution of the manual mode. On the other hand, during the execution of the autonomous mode, the controller 14 is able to autonomously move the autonomous mobile body 1 in accordance with the traveling schedule TS.

Figure 3:
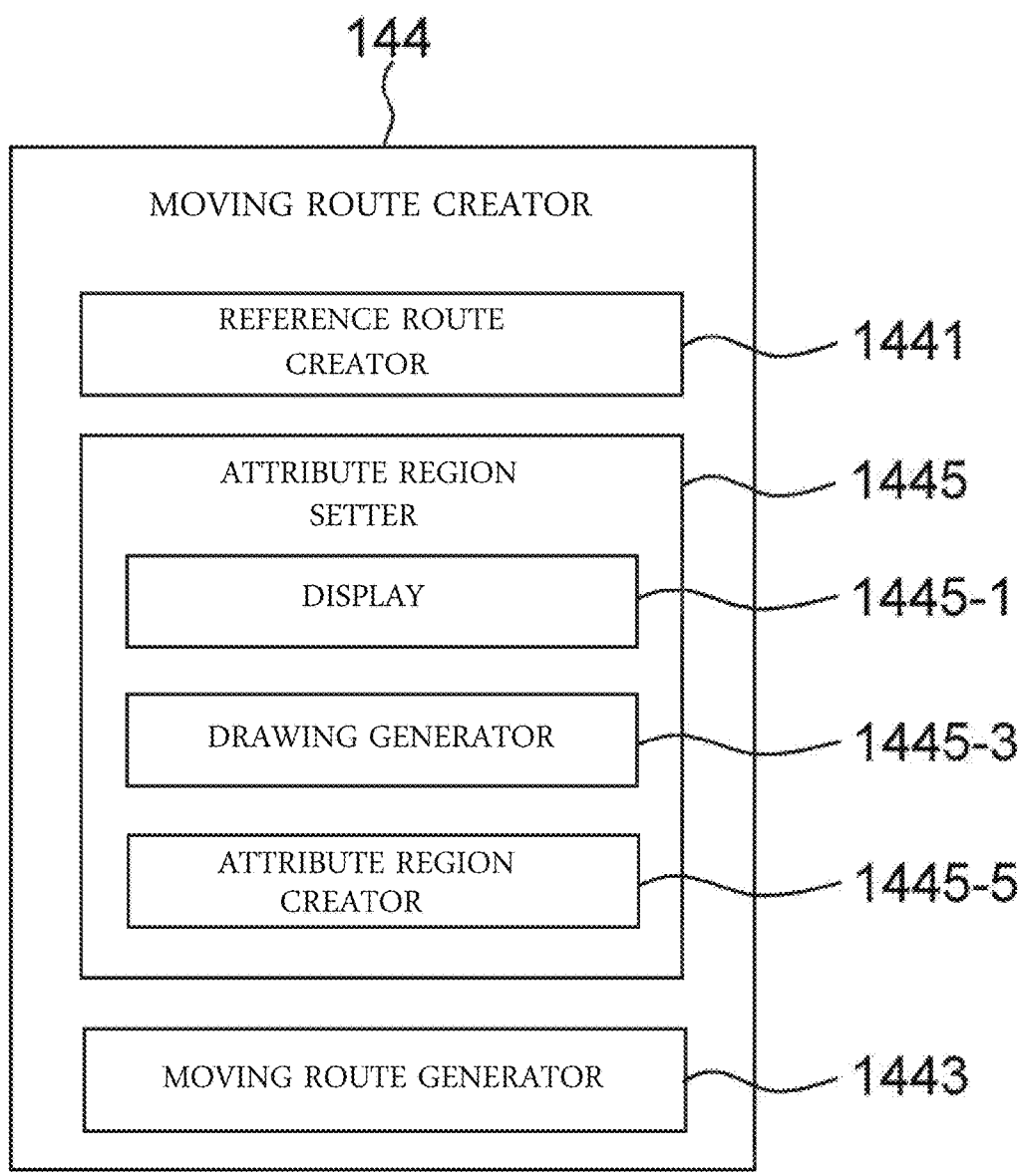
FIG. 3 is a diagram illustrating a configuration of a moving route creator.

A configuration and a function of the moving route creator 144 will be described below with reference to FIG. 3. FIG. 3 is a diagram illustrating the configuration of a moving route creator.

The moving route creator 144 includes a reference route creator 1441. The reference route creator 1441 creates a reference route SP on an environment map M1. When the reference route SP is a center of the passage on the environment map M1, for example, a line is drawn on a position passing through the center of the passage on the environment map M1 by using a CAD displaying the environment map M1 so as to create a reference route SP in advance as graphic data. The reference route creator 1441 performs coordinate conversion on the reference route SP as graphic data, so as to be capable of creating the reference route SP as aggregate of the coordinate values of the movement coordinate system. Further, the reference route creator 1441 may create a reference route SP using a user interface UI to set an attribute region AR (an attribute map M3), similarly to the case of the CAD.

The graphic data is not limited to the reference route SP, and the reference route creator 1441 may create the reference route SP through calculation. For example, a midpoint of a passage (a line that equally divides a passage into two) present on the environment map M1 may be calculated as the reference route SP.

When the reference route SP is desired to be a moving route on which the autonomous mobile body 1 has actually moved, the reference route creator 1441 is able to create, for example, the reference route SP as follows.

First, during execution of the manual mode, while the autonomous mobile body 1 is moving from a moving start position to a moving end position, a self position and/or a posture at a predetermined time are/is acquired from the self position estimator 143 every predetermined time (for example, every control cycle of the controller 14). As a result, a plurality of passing points (referred to as subgoal points) on the environment map M1 through which the autonomous mobile body 1 passes while moving from the moving start position to the moving end position are able to be acquired as an aggregate of coordinate values of the movement coordinate system.

The reference route creator 1441 stores the aggregate of the coordinate values as a reference route SP in the storage 141.

The reference route creator 1441 may associate other information regarding the respective subgoal points with the coordinate values of the plurality of subgoal points acquired at every predetermined time, so as to create a reference route SP. For example, the reference route creator 1441 may associate times at which the subgoal points are acquired with the coordinate values of the plurality of acquired subgoals, so as to create a reference route SP. Alternatively, the reference route creator 1441 may associate moving speeds of the autonomous mobile body 1 at the time of acquisition of the subgoal points with the coordinate values of the plurality of acquired subgoals, so as to create a reference route SP.

As a result, during the execution of the autonomous mode, the autonomous mobile body 1 is able to perform operations indicated by the information associated with the subgoal points in the reference route SP (for example, an operation to reach the subgoal points at times associated with the subgoal points, and an operation to move the autonomous mobile body 1 at speeds associated with the subgoal points.

The moving route creator 144 includes a moving route generator 1443. The moving route generator 1443 creates a traveling schedule TS from a reference route SP based on the widthwise-shift attribute set on an attribute map M3. In this preferred embodiment, the moving route generator 1443 shifts a reference route SP right or left in accordance with an attribute indicated by the widthwise-shift attribute, so as to create a traveling schedule TS.

The moving route creator 144 includes an attribute region setter 1445. The attribute region setter 1445 sets a widthwise-shift attribute. Specifically, the attribute region setter 1445 sets, as a widthwise-shift attribute, as to which range in a movement coordinate system the reference route SP is shifted right or left. Thus, the widthwise-shift attribute set by the attribute region setter 1445 is set as a range (a region) on the movement coordinate system. Therefore, the widthwise-shift attribute in this preferred embodiment is referred to as an "attribute region AR".

Specifically, the attribute region setter 1445 includes a display 1445-1. The display 1445-1 displays at least a portion of an environment map M1 on a predetermined region of a display in a computer system of the controller 14.

The attribute region setter 1445 includes a drawing generator 1445-3. The drawing generator 1445-3 draws a region having a predetermined shape to be the attribute region AR on at least a portion of the environment map M1 displayed on the display by the display 1445-1.

The drawing generator 1445-3 is able to draw a region having a predetermined shape, such as a rectangle, an oval, a circle, or a polygon (a triangle, a square (a rectangle), a pentagon, or a hexagon) on at least a portion of an environment map M1, and is able to set the region having such a shape as the attribute region AR.

In this preferred embodiment, the drawing generator 1445-3 is able to color an inside of the attribute region AR set as above with a specified coloring density. For example, the drawing generator 1445-3 fills the inside of the attribute region AR drawn on the environment map M1 with the coloring density set by the user, so as to be capable of coloring the inside of the attribute region AR.

The attribute region setter 1445 includes an attribute region creator 1445-5. The attribute region creator 1445-5 associates a widthwise-shift attribute with a predetermined region drawn by the drawing generator 1445-3, so as to generate an attribute region AR. In this preferred embodiment, the attribute region setter 1445 decides a widthwise-shift attribute to be associated with the attribute region AR based on coloring density within the attribute region AR.

For example, the reference route SP included in the attribute region AR is defined as not being shifted when the coloring density of the attribute region AR is half (about 50% of the coloring density) of the highest color density (about 100% of the coloring density). In this case, the attribute region creator 1445-5 associates, for example, a widthwise-shift attribute, to shift the reference route SP to the left with respect to the moving direction, with an attribute region AR that is colored with a color having coloring density lower than about 50% (a color lower than about 50% of the coloring density).

On the other hand, the attribute region creator 1445-5 associates a widthwise-shift attribute, to shift the reference route SP to the right with respect to the moving direction, with an attribute region AR that is colored with a color having coloring density higher than about 50% (a color higher than about 50% of the coloring density).

In this preferred embodiment, the attribute region creator 1445-5 allows, based on the coloring density within the attribute region AR, the widthwise-shift attribute to include a parameter regarding how much the reference route SP is shifted to the right or left.

The parameter indicating a percentage of shifting the reference route SP to the right or left (namely, a parameter indicating a percentage of the right shift or the left shift from the reference route SP) is referred to as a "shift percentage".

The shift percentage can be a numerical value corresponding to coloring density of the attribute region AR. For example, the "shift percentage" preferably is about 25% when the reference route SP is shifted to an intermediate position between the reference route SP and a boundary line present on a left-shifted position from the reference route SP with respect to the moving direction of the autonomous mobile body 1.

On the other hand, the "shift percentage" preferably is about 75% when the reference route SP is shifted to an intermediate position between the reference route SP and a boundary line present on a right-shifted position from the reference route SP with respect to the moving direction of the autonomous mobile body 1.

When the attribute region creator 1445-5 allows the shift percentage to be included in the widthwise-shift attribute as a parameter, an amount of shift to the right or left from the reference route SP is able to be set to any value in the attribute region AR.

Further, the drawing generator 1445-3 is capable of coloring a region having a predetermined shape representing the attribute region AR. The attribute region creator 1445-5 calculates the shift percentage based on the coloring density within the attribute region AR as described above, so as to be capable of visually setting the shift amount of the reference route SP in the set attribute region AR.

The above configuration enables the attribute region setter 1445 to visually check at least a portion of the environment map M1 displayed on the display and to simultaneously set a desired attribute region AR at a desired position of at least the portion of the environment map M1.

Figure 4:
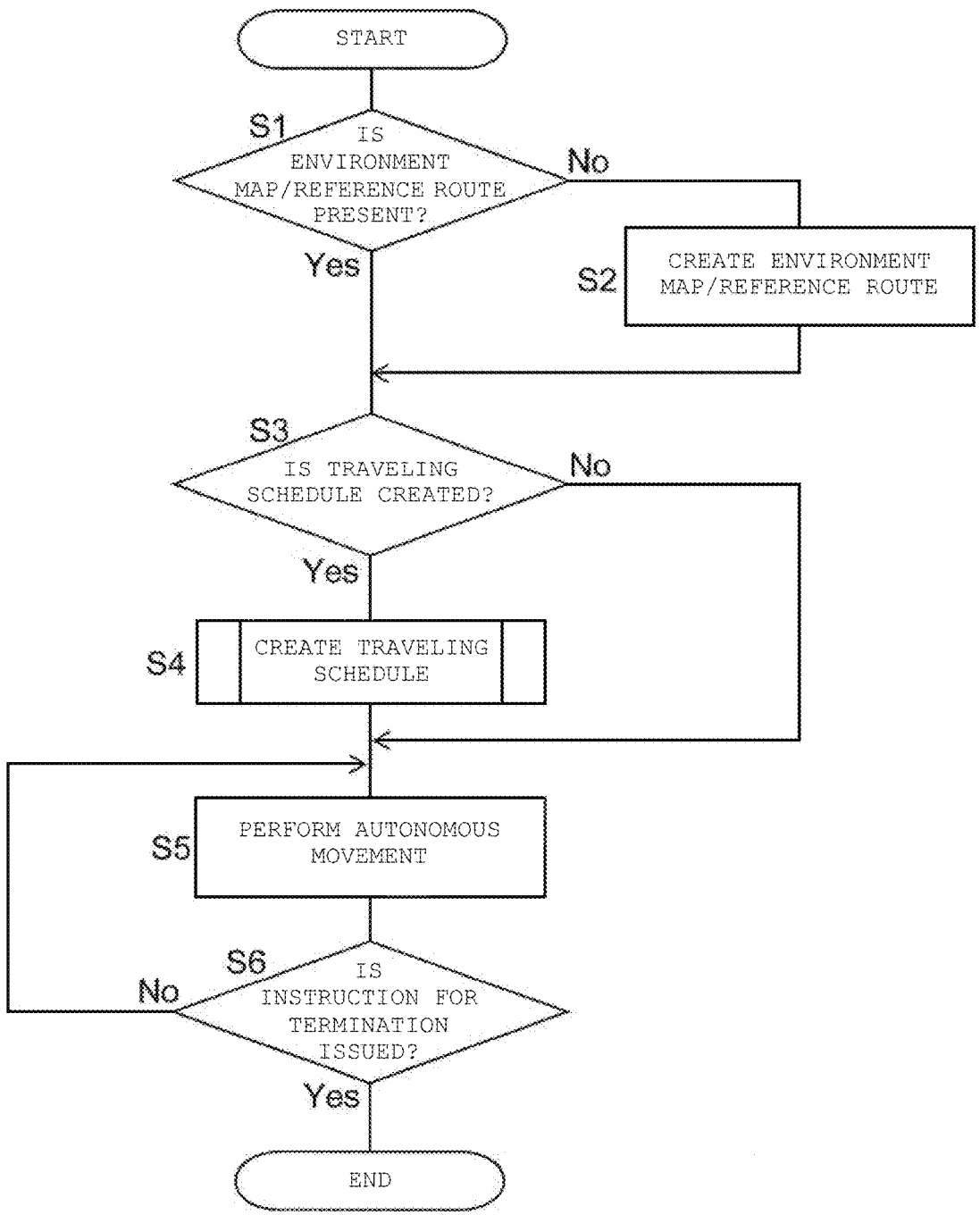
FIG. 4 is a flowchart illustrating an outline of a general operation of an autonomous mobile body.

An overall operation of the autonomous mobile body 1 will be described below with reference to FIG. 4. FIG. 4 is a schematic flowchart illustrating the overall operation of the autonomous mobile body. The operation of the autonomous mobile body 1 will be described below by taking, as an example, a case where a line passing through a center of a passage in the environment map M1 is used as a reference route SP.

When the operation of the autonomous mobile body 1 starts, (the moving route creator 144 of) the controller 14 determines whether a traveling schedule TS is created by using a reference route SP. Specifically, first, in order to create a traveling schedule TS, the moving route creator 144 determines whether at least an environment map M1 and a reference route SP are stored in the storage 141 (step S1).

When an environment map M1 and/or a reference route SP are/is not stored in the storage 141 ("No" in step S1), the moving route creator 144 creates an environment map M1 and a reference route SP (step S2).

On the other hand, when an environment map M1 and/or a reference route SP are/is stored in the storage 141 ("Yes" in step S1), the moving route creator 144 displays, for example, a message asking whether a traveling schedule TS is created on the display of the controller 14 (step S3).

When a user who sees the message makes a selection, such that a traveling schedule TS is not created, through an input device of the controller 14 and/or the operation device of the autonomous mobile body 1 ("No" in step S3), the moving route creator 144 does not create a traveling schedule TS, and the process proceeds to step S5. That is, a user switches to the autonomous mode, so that autonomous movement of autonomous mobile body 1 is started.

On the other hand, when the user selects creation of a traveling schedule TS ("Yes" in step S3), the moving route creator 144 creates a traveling schedule TS using the reference route SP, the environment map M1, and the attribute map M3 (when stored in the storage 141) which are stored in the storage 141 (step S4).

A creating process of the traveling schedule TS in step S4 will be described in detail later.

After the environment map M1, the reference route SP, and/or the traveling schedule TS are/is created by performing steps S1 to S4 as necessary, a user selects the autonomous mode as the operation mode. As a result, the autonomous mobile body 1 starts to move autonomously in accordance with the traveling schedule TS (step S5).

Specifically, the self position estimator 143 firstly estimates a self position and/or a posture of the autonomous mobile body 1 during the movement in the autonomous mode through map matching between the environment map M1 stored in the storage 141 and the local map M2 acquired during the movement of the autonomous mobile body 1 in the autonomous mode.

The traveling controller 145 then compares a self position and/or a posture estimated by the self position estimator 143 with the traveling schedule TS stored in the storage 141, and calculates control amounts of the motors 121a and 121b based on a difference between the current self position and/or posture and a subgoal point to be a next arrival position, so as to output electric power according to the control amounts of the motors 121a and 121b.

For example, the above autonomous movement in step S5 continues until a user instructs to stop the movement of the autonomous mobile body 1 using the operation device, or until the autonomous mobile body 1 is determined to have passed through all passing points indicated by the traveling schedule TS and reached a moving end position through execution of the autonomous mode ("No" in step S6).

On the other hand, when the determination is made that the movement of the autonomous mobile body 1 is stopped by the operation device or that the autonomous mobile body 1 has reached the moving end position indicated in the traveling schedule TS ("Yes" in step S6), the autonomous mobile body 1 terminates the operation.

The execution of steps S1 to S6 enables the traveling controller 145 to control the mobile unit 12 so that the mobile unit 12 passes through subgoal points indicated in the traveling schedule TS. As a result, the autonomous mobile body 1 moves in accordance with the traveling schedule TS.

Figure 5:
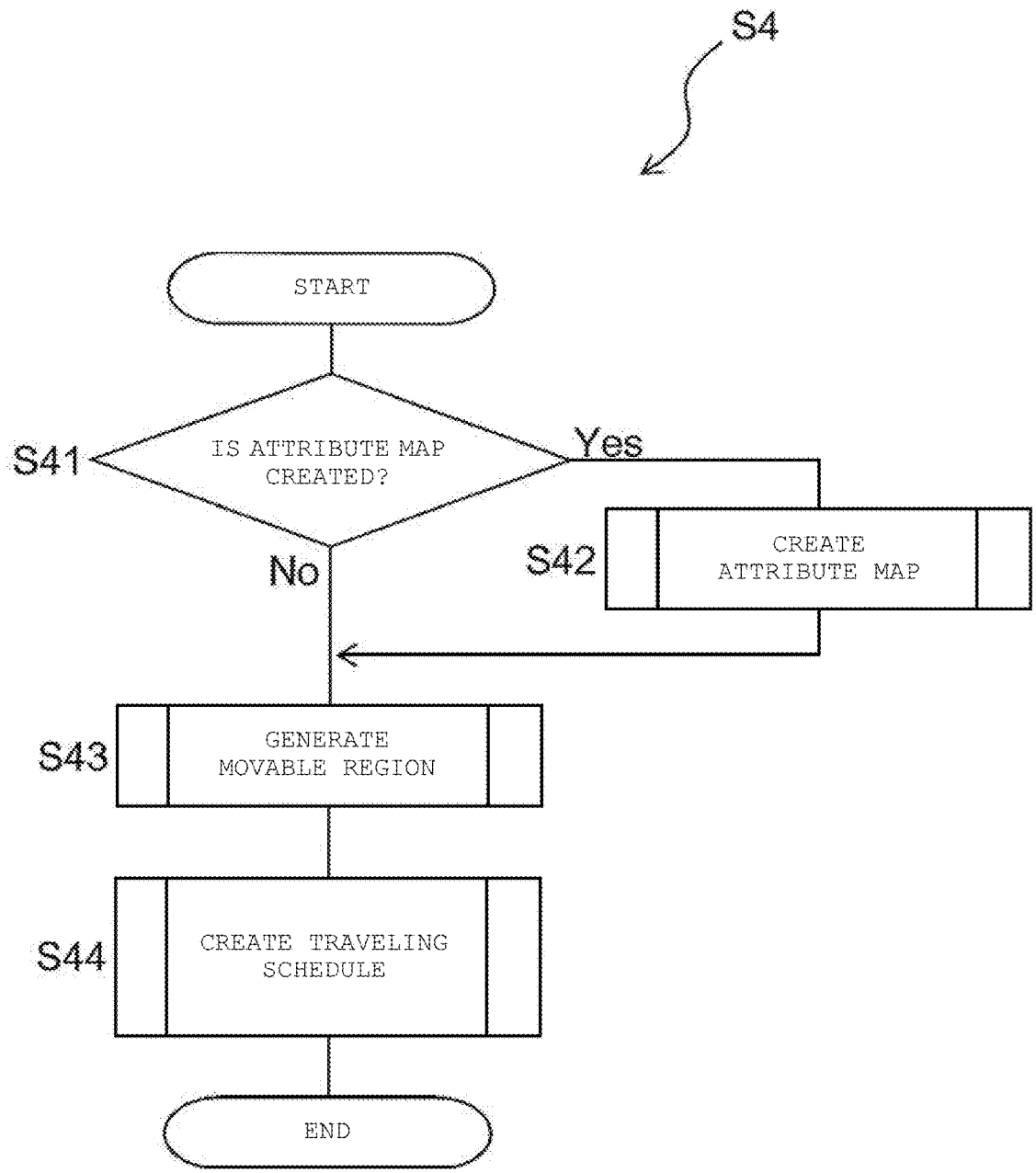
FIG. 5 is a flowchart illustrating an outline of a method for creating a traveling schedule.

The method for creating a traveling schedule TS to be executed in step S4 will be described below with reference to FIG. 5. FIG. 5 is a flowchart illustrating an outline of the method for creating a traveling schedule.

When creation of the traveling schedule TS is started, the moving route creator 144 determines whether an attribute map M3 including a widthwise-shift attribute is created (step S41). For example, when an attribute map M3 is present in the storage 141, the moving route creator 144 shows a display, asking a user whether a new attribute map M3 is to be created, on the display of the controller 14.

When an attribute map M3 is not stored in the storage 141, the moving route creator 144 does not show the above display, and starts to create an attribute map M3.

When the user selects not to create a new attribute map M3 on the display to ask whether a new attribute map M3 is to be created ("No" in step S41), a traveling schedule TS is created by using the attribute map M3 stored in the storage 141.

On the other hand, when the user selects to create a new attribute map M3 on the above display ("Yes" in step S41), an attribute map M3 is created (step S42).

In this preferred embodiment, an attribute map M3 is created by using a user interface UI (FIG. 7 and the like) to create an attribute map M3. Specifically, the user "draws" an attribute region AR having a predetermined shape on at least a portion of an environment map M1 displayed on a map display interface DI (described later) of the user interface UI. Thereafter, a widthwise-shift attribute (and a shift percentage) is associated with the drawn attribute region AR, and the attribute region AR is converted into numerical values so that an attribute map M3 including the attribute region AR is created.

After the attribute map M3 is created and is stored in the storage 141, the moving route generator 1443 creates a traveling schedule TS using the environment map M1, the attribute map M3, and the reference route SP stored in the storage 141.

Specifically, the moving route generator 1443 first generates a region (referred to as a movable region) where the traveling schedule TS is able to be set (where the autonomous mobile body 1 moves) on the environment map M1 (in the movement coordinate system) (step S43).

In this preferred embodiment, the movable region is generated as a region on the environment map M1 between (subgoal points of) the reference route SP and a boundary line of an obstacle (a wall of a passage) on the environment map M1 present in a direction decided by the widthwise-shift attribute associated with the attribute region AR, or between (subgoal points of) the reference route SP and a boundary line of the attribute region AR (referred to as a moving boundary line).

After the movable region is generated, the moving route generator 1443 deletes the generated movable region in accordance with a numerical value of a shift percentage included as a parameter of a widthwise-shift attribute, so as to generate a widthwise-shift capability region. The moving route generator 1443 shifts the reference route SP into the widthwise-shift capability region so as to create a traveling schedule TS (step S44).

The execution of steps S41 to S44 enables the appropriate creation of the traveling schedule TS in which the autonomous mobile body 1 is moved toward the right or left with respect to the reference route SP.

The following will describe details of a method for creating the attribute map M3 in step S42, the method for generating the movable region in step S43, and the method for creating the traveling schedule TS in step S44. These method are carried out until the traveling schedule TS is created.

Figure 6:
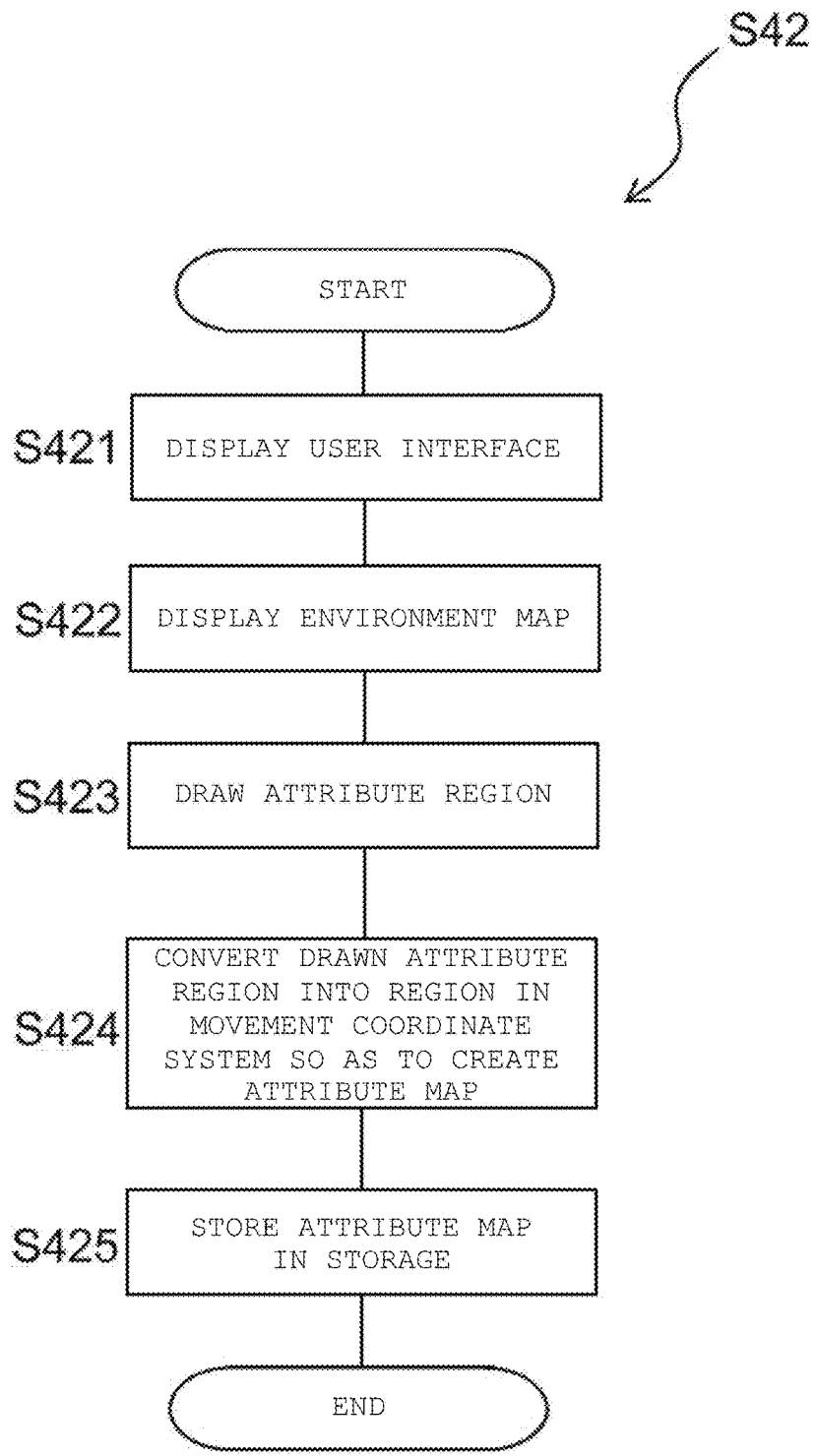
FIG. 6 is a flowchart illustrating one example of a method for creating an attribute map.

The method for creating the attribute map M3 in step S42 will be described below with reference to FIG. 6. FIG. 6 is a flowchart illustrating one example of the method for creating an attribute map. As described above, the attribute map M3 is visually created by using the user interface UI.

Figure 7:
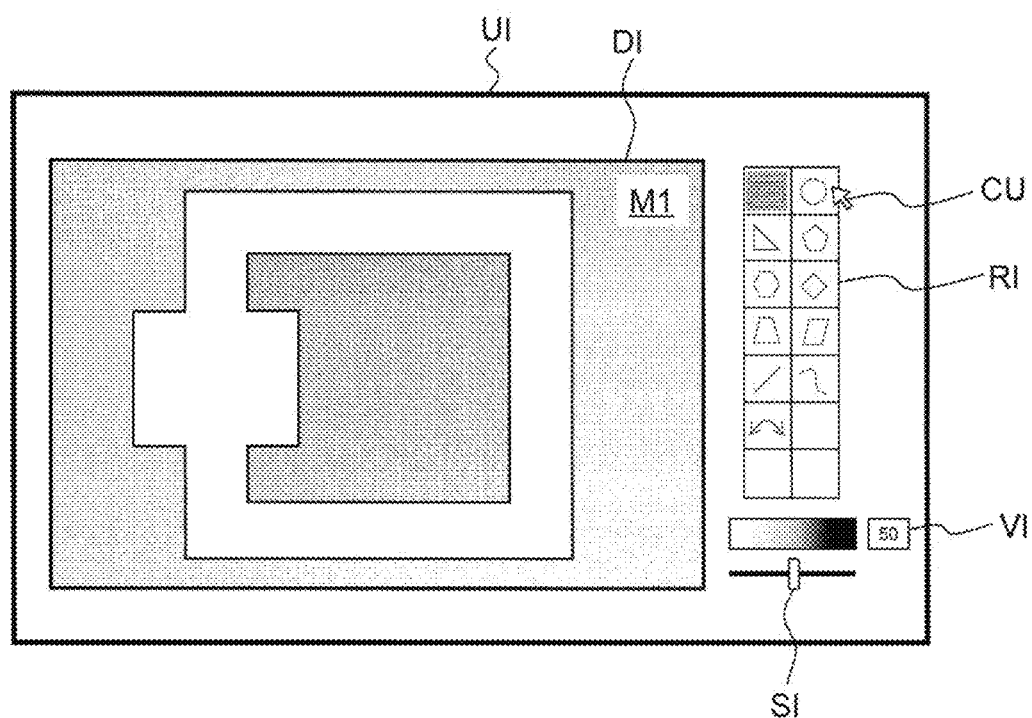
FIG. 7 is a diagram illustrating one example of a user interface used to create an attribute map.

Specifically, when the creation of the attribute map M3 is started, for example, the user interface UI illustrated in FIG. 7 is shown on the display of the controller 14 (step S421) so that the attribute region setter 1445 is able to visually set the attribute region AR. FIG. 7 is a diagram illustrating one example of a user interface to create an attribute map.

When the user interface UI is shown on the display, the display 1445-1 displays an environment map M1 on the map display interface DI in the user interface UI (step S422). As a result, the environment map M1 is able to be visually checked on the user interface UI.

When the environment map M1 is displayed on the map display interface DI, a user draws the attribute region AR having a predetermined shape within the map display interface DI using a cursor CU and the input device (step S423).

Specifically, the user first presses a button indicating a shape desired to be set as the attribute region AR among a plurality of buttons on an region shape selecting interface RI disposed to the right of the map display interface DI (for example, presses the button by clicking with a mouse). As a result, the shape to be set as the attribute region AR is selected.

In this preferred embodiment, the selected button portion of the region shape selecting interface RI is colored with a color different from the colors of the other buttons. In the example illustrated in FIG. 7, a portion indicating a rectangle is colored gray (the other buttons are colored white). As a result, in the example illustrated in FIG. 7, a rectangle is visually checked as being selected as the shape of the attribute region AR.

A user then slides, for example, a slider interface SI disposed below the region shape selecting interface RI, in a right-left direction, so as to set a coloring density of an attribute region AR to be drawn.

When the slider interface SI is slid in the right-left direction, a display value of a coloring density display interface VI (FIG. 7) disposed near the slider interface SI changes. As a result, the setting value of the currently set coloring density is able to be visually checked.

Besides sliding of the slider interface SI, the user is able to directly input the setting value of the coloring density within the coloring density display interface VI.

After setting the shape and the coloring density of the attribute region AR to be set, the user specifies a range of the attribute region AR desired to be set within the map display interface DI using the cursor CU and the input device. As a result, as illustrated in FIG. 8A, a range where the attribute region AR is desired to be set (in FIG. 8A, a range surrounded by a dotted line) is able to be specified regardless of a width of a passage displayed on the environment map M1 (in FIG. 8A, a region indicated by white in the map display interface DI).

Figure 8A:
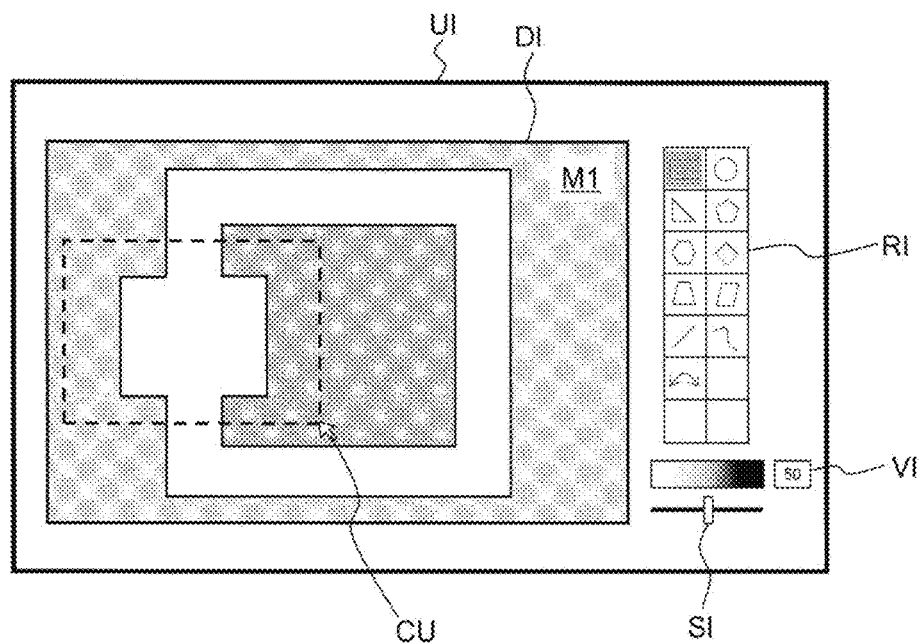
FIG. 8A is a diagram illustrating one example of a method for specifying a range of an attribute region.

FIG. 8A is a diagram illustrating one example of the method for specifying a range of an attribute region.

Thereafter, the drawing generator 1445-3 acquires information regarding the shape of the attribute region AR with the button of the region shape selecting interface RI being pressed. Further, the coloring density when the attribute region AR is colored is acquired from the numerical value displayed on the coloring density display interface VI or information regarding a position of the slider interface SI.

After the information and the coloring density regarding the shape of the attribute region AR are acquired, the drawing generator 1445-3 draws the attribute region AR having the specified shape and coloring density in the range specified by the user within the map display interface DI.

Figure 8B:
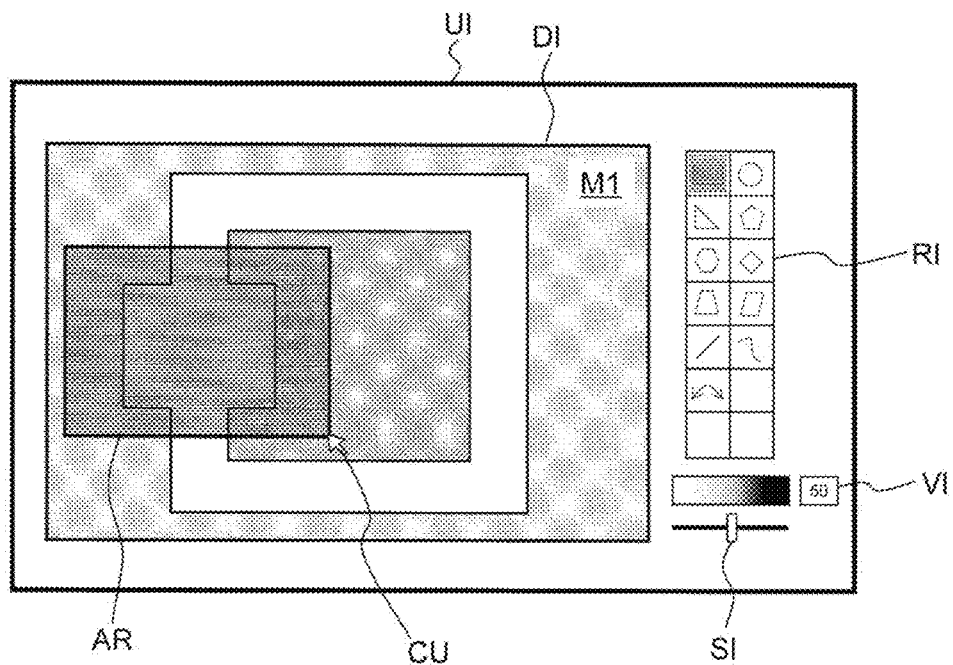
FIG. 8B is a diagram illustrating one example of a method for drawing a rectangular or substantially rectangular attribute region.

For example, as illustrated in FIG. 8A, when the range desired to be set as the attribute region AR is specified as the rectangular range within the map display interface DI, if a rectangle is selected as the shape of the attribute region AR, the drawing generator 1445-3 uses, as illustrated in FIG. 8B, the range having the specified rectangle directly as a boundary line of the attribute region AR so as to color the rectangle with the specified coloring density.

FIG. 8B is a diagram illustrating one example of the method for drawing a rectangular or substantially rectangular attribute region.

Figure 8C:
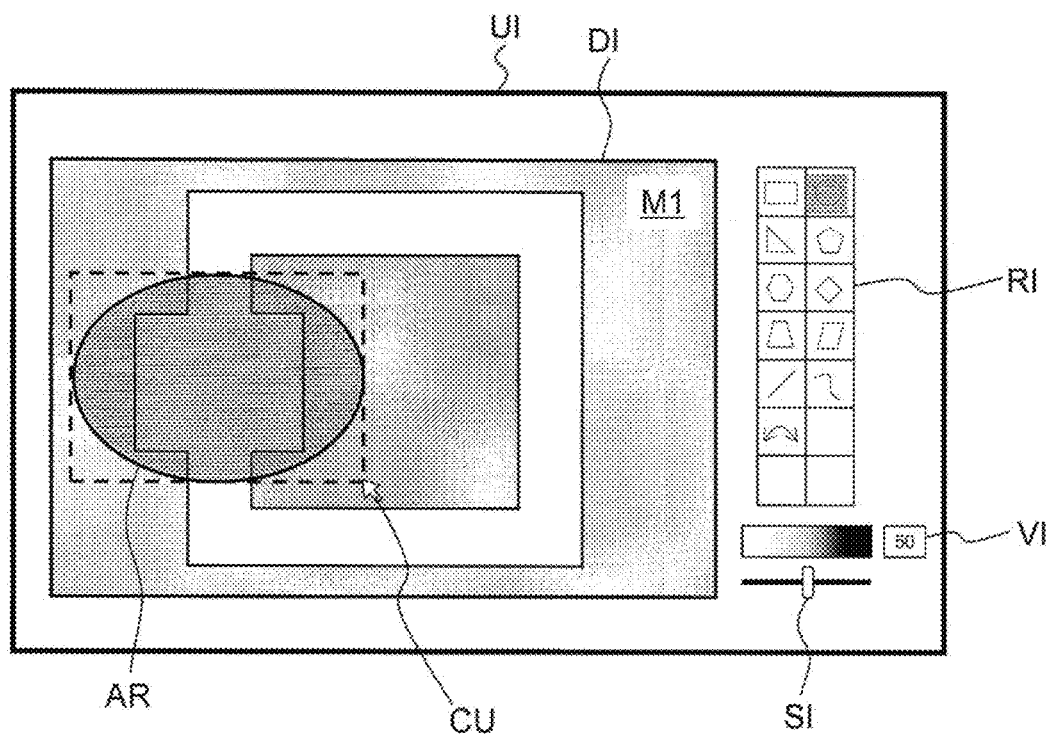
FIG. 8C is a diagram illustrating one example of a method for drawing an attribute region having a shape other than a rectangle.

On the other hand, when a shape other than a rectangle is selected for the shape of the attribute region AR (for example, a circle or an oval), as illustrated in FIG. 8C, the drawing generator 1445-3 draws the attribute region AR having the selected shape (the circle or the oval) that is inscribed in or circumscribed to the rectangular range specified by the user, and colors the drawn region with the specified coloring density. FIG. 8C is a diagram illustrating one example of the method for drawing an attribute region having a shape other than a rectangle.

Steps S421 to S423 are repeated until all the attribute regions AR desired to be set on the environment map M1 are set.

After all the attribute regions AR desired to be set are drawn on the map display interface DI, for example, an "attribute map creating button" (not illustrated) disposed on the user interface UI is pressed, so that an attribute map M3 including the set attribute regions AR is created (step S424). Specifically, the attribute region creator 1445-5 converts, for example, the attribute regions AR as graphic data into regions available in the movement coordinate system as described below so as to create an attribute map M3.

The attribute region creator 1445-5 first converts a coordinate value of each pixel of each attribute region AR as graphic data on the map display interface DI into a coordinate value in the movement coordinate system. This coordinate conversion is able to be performed by, for example, coordinate calculation using a matrix.

Then, coloring density of each pixel of each attribute region AR as graphic data is converted into a numerical value in a range between 0% and 100%, so that (a shift percentage of) a widthwise-shift attribute is calculated based on the coloring density of each attribute region AR as graphic data.

Thereafter, the widthwise-shift attribute (the shift percentage) is associated with the attribute region AR that is converted into data of the movement coordinate system, so that a final attribute region AR is created. Further, the above conversion is performed on all the set attribute regions AR, and the plurality of attribute regions AR that is converted into numerical values is made to be one piece of data so that the attribute map M3 is created.

After the conversion of the attribute regions AR into numerical values, an inequality defined in the movement coordinate system is calculated, so that the attribute regions AR may be expressed by the inequality. In this case, for example, in the movement coordinate system, a function expressing a boundary line of the attribute region AR is calculated, and the inequality expressing the attribute region AR is able to be calculated based on which side of the boundary line (upper, lower, right and left side of the boundary line) the attribute region AR is present.

The attribute region creator 1445-5 stores the attribute map M3 created as described above in the storage 141 (step S425).

Execution of steps S421 to S425 enables an environment map M1 displayed on the map display interface DI to be visually checked and simultaneously enables a desired attribute region AR to be visually set on a desired position of the environment map M1 (the movement coordinate system).

As a result, the attribute region AR is able to be set as desired without being influenced by information indicated on the environment map M1 (displayed on the map display interface DI), such as a passage width and disposition of an obstacle.

Figure 9:
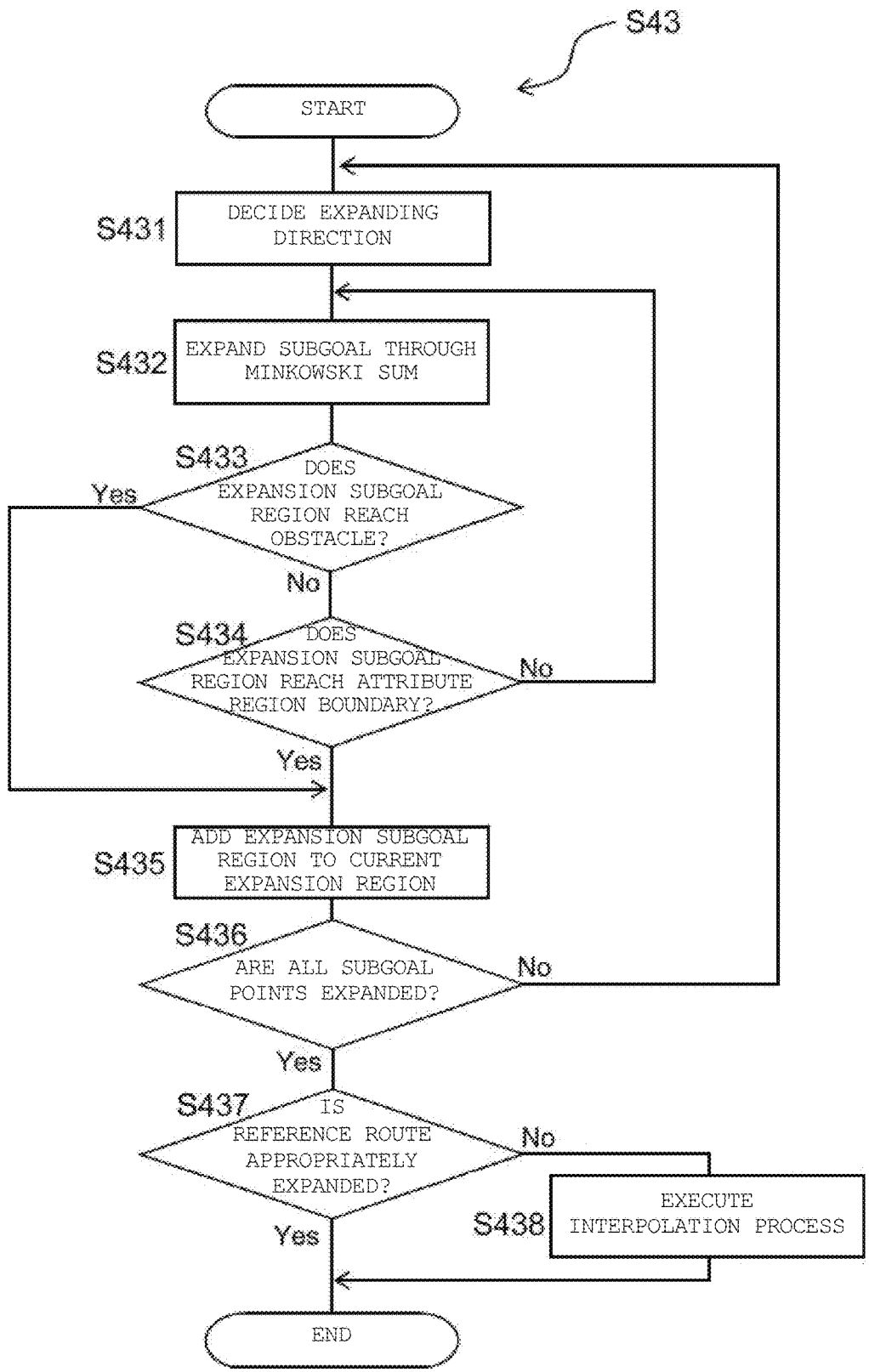
FIG. 9 is a flowchart illustrating a method for generating a movable region.

A method for generating a movable region to be performed in step S43 will be described in detail below with reference to FIG. 9. FIG. 9 is a flowchart illustrating the method for generating a movable region.

Figure 10:
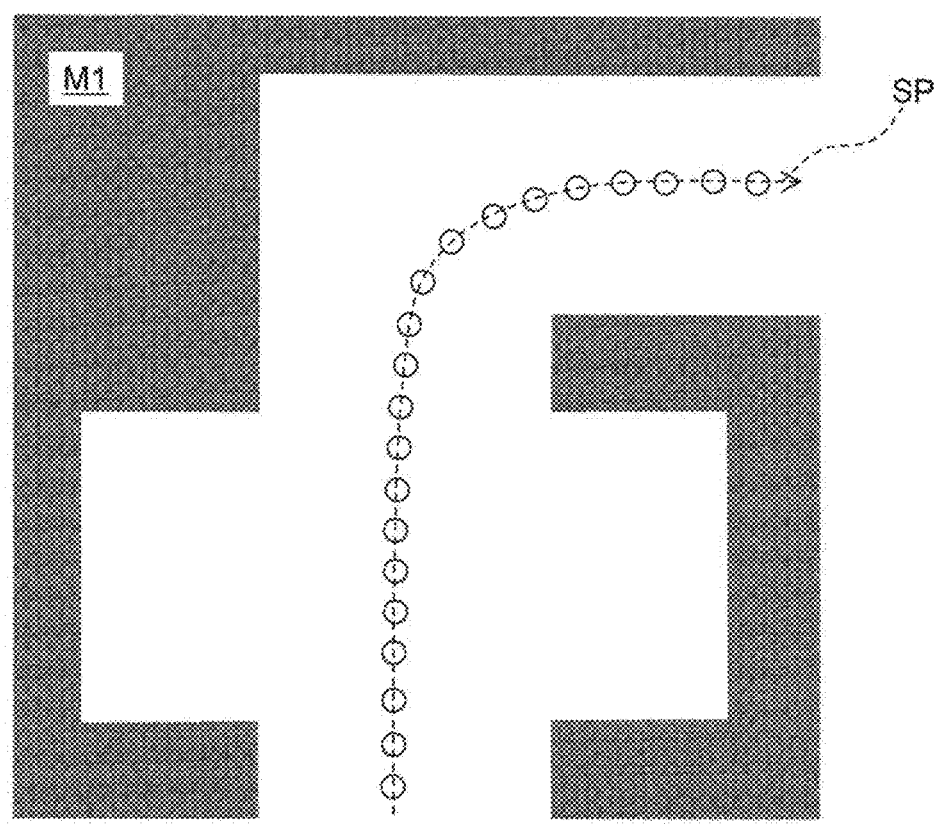
FIG. 10 is a diagram illustrating examples of an environment map and a reference route.

The following description refers to, as an example, generation of a movable region in a case where, on (a portion of) an environment map M1 illustrated in FIG. 10, a route, which passes through a center of a passage (in FIG. 10, a portion indicated by white on the environment map M1) and shifts in a direction of a dotted-line arrow in FIG. 10, is defined as the reference route SP. FIG. 10 is a diagram illustrating examples of an environment map and a reference route.

In this preferred embodiment, the moving route generator 1443 expands respective subgoal points included in the reference route SP (in FIG. 10, indicated by white points on the reference route SP) in a direction of the widthwise-shift attribute associated with the attribute region AR including the subgoal points, so as to generate an expansion region obtained by expanding the reference route SP. The moving route generator 1443 interpolates the expansion region as necessary so as to generate a movable region.

Specifically, first, the moving route generator 1443 decides an expanding direction of a currently selected subgoal point (step S431). The moving route generator 1443 decides the expanding direction of the currently selected subgoal point in the following manner, for example.

The moving route generator 1443 determines which attribute region AR on the attribute map M3 includes the currently selected subgoal point. The moving route generator 1443 then specifies a widthwise-shift attribute (a shift percentage) associated with the attribute region AR including the subgoal point. Thereafter, the moving route generator 1443 decides the expanding direction of the currently selected subgoal point, based on the specified widthwise-shift attribute (shift percentage).

For example, when the shift percentage as a parameter of a widthwise-shift attribute is larger than about 50%, the moving route generator 1443 decides that the currently selected subgoal point is to be expanded to the right side with respect to the moving direction of the autonomous mobile body 1. On the other hand, when the shift percentage is smaller than about 50%, the moving route generator 1443 decides that the currently selected subgoal point is to be expanded to the left side with respect to the moving direction of the autonomous mobile body 1.

When the specified shift percentage is about 50% or the attribute region AR is not set for the currently selected subgoal point, the reference route SP is not expanded and is maintained in that state.

After deciding a side to which the reference route SP is to be expanded with respect to the moving direction, the moving route generator 1443 further decides an angle direction on the movement coordinate system in which the reference route SP is to be expanded. The angle direction on the movement coordinate system in which the reference route SP is to be expanded is referred to as an "expanding direction".

In this preferred embodiment, the expanding direction of the currently selected subgoal point is a direction in which a bisector of an angle defined by two straight lines extends, the two straight lines connecting the subgoal point and two subgoal points adjacent to that subgoal point on both sides.

Figure 11A:
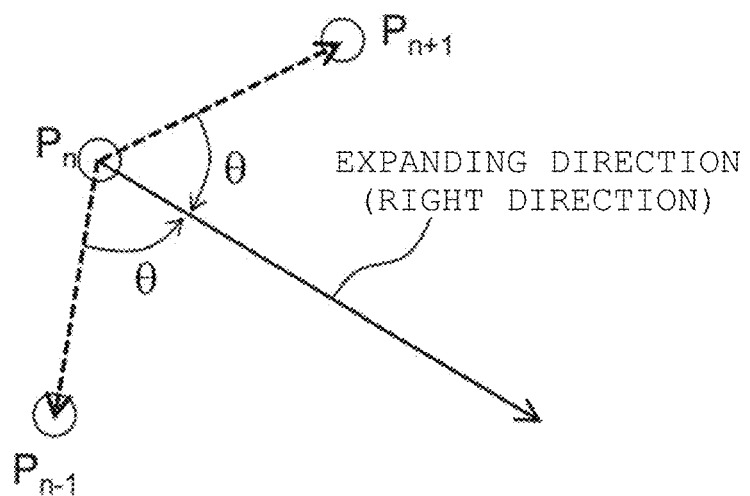
FIGS. 11A and 11B are diagrams schematically illustrating examples of a method for calculating an expanding direction of a subgoal point.
Figure 11B:
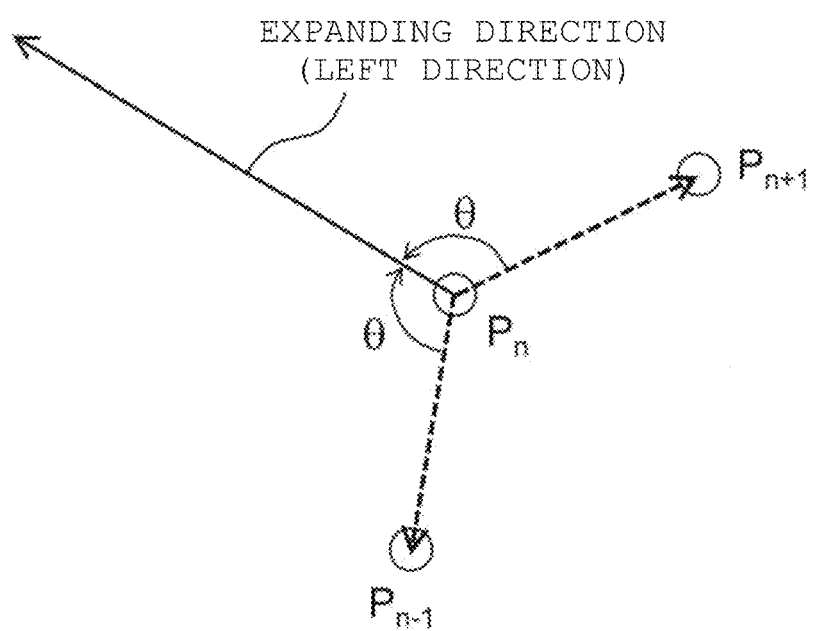

Specifically, for example as illustrated in FIGS. 11A and 11B, when the currently selected subgoal point is denoted by $P_n$, the subgoal point adjacent to $P_n$ in the moving direction of the autonomous mobile body 1 is denoted by $P_{n+1}$, and a subgoal point adjacent to $P_n$ on an opposite side of $P_n$ from the moving direction of the autonomous mobile body 1 is denoted by $P_{n-1}$, a direction, in which the bisector of an angle 20 defined by a straight line $P_nP_{n-1}$ and a straight line $P_nP_{n+1}$ extends, is the expanding direction. FIGS. 11A and 11B are diagrams schematically illustrating examples of a method for calculating an expanding direction of a subgoal point.

In examples of FIGS. 11A and 11B, when the subgoal point $P_n$ is expanded to the right side with respect to the moving direction, as illustrated in FIG. 11A, a bisector, which extends in an inward direction (center-ward direction) of a curved route defined by the subgoal points $P_{n-1}$, $P_n$, $P_{n+1}$, is the expanding direction.

On the other hand, when the subgoal point $P_n$ is expanded to the left side with respect to the moving direction, as illustrated in FIG. 11B, a bisector, which extends in an outward direction (a direction separated from the center) of the curved route including the subgoal points $P_{n-1}$, $P_n$, $P_{n+1}$, is the expanding direction.

After deciding the expanding direction of the currently selected subgoal point, the moving route generator 1443 expands the currently selected subgoal point in the decided expanding direction by a radius of a size of the autonomous mobile body 1 (step S432). Note that "the radius of the size of the autonomous mobile body 1" is a radius of a circle when the autonomous mobile body 1 is assumed to have a circular shape.

In this preferred embodiment, the expansion of the subgoal point is performed by using a Minkowski sum. The expansion of the subgoal point through the Minkowski sum is able to be realized by, for example as illustrated in FIG. 12, disposing a plurality of circles having the radius (rv) of the size of the autonomous mobile body 1 along the expanding direction from the currently selected subgoal point and summing regions of the plurality of circles disposed along the expanding direction.

Figure 12:
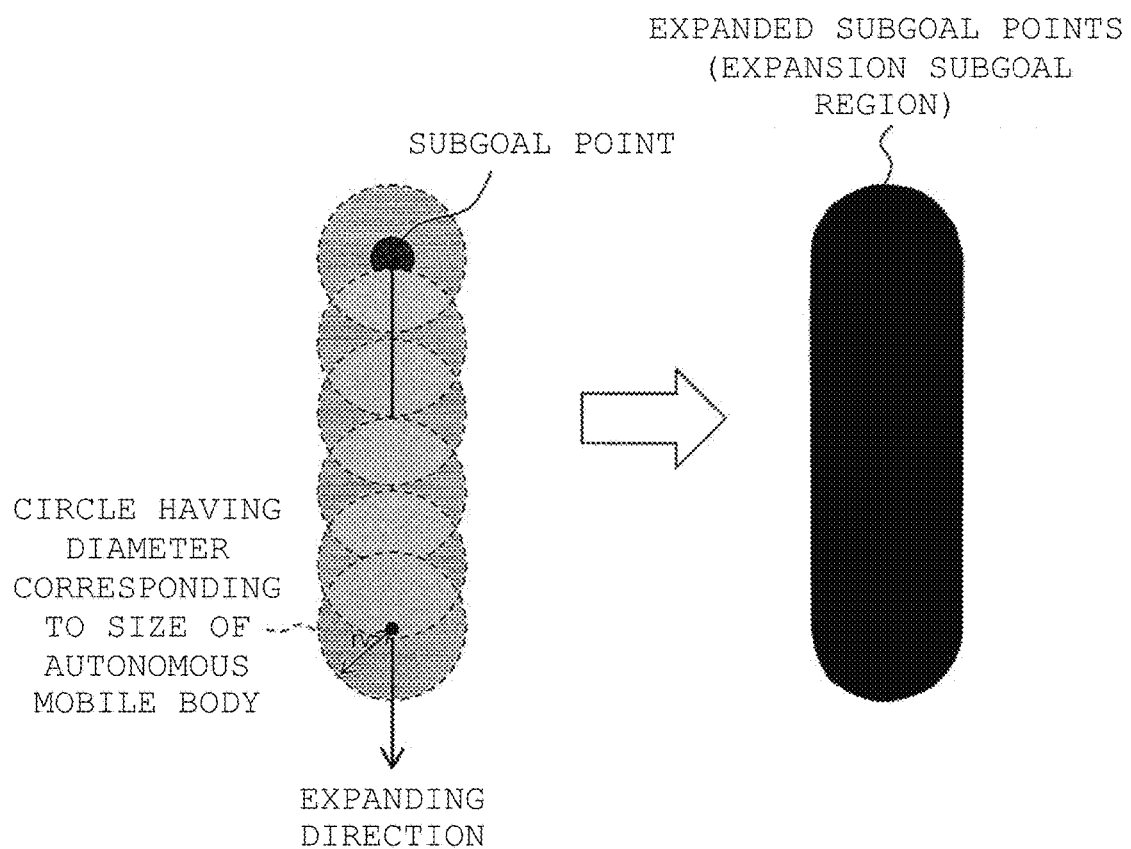
FIG. 12 is a diagram schematically illustrating expansion of a subgoal point in accordance with a Minkowski sum.

FIG. 12 is a diagram schematically illustrating the expansion of a subgoal point in accordance with the Minkowski sum.

As illustrated in FIG. 12, the subgoal point expanded by the Minkowski sum is a region having a shape close to an elongated oval. Such a region, which is obtained by expanding a subgoal point through the Minkowski sum is referred to as a "expansion subgoal region".

An expansion speed of a subgoal point per one-time expansion is preferably low. Specifically, the subgoal point is shifted in the expanding direction by one pixel of the environment map M1 per one-time expansion from, for example, the position where the circle having the radius of the size of the autonomous mobile body 1, and is expanded by an increase in an area when the circle is disposed (referred to as a unit expansion area).

When the expansion speed of a subgoal point is made to be low, the expansion of the subgoal point is prevented from stopping extremely before a boundary line of an obstacle on the environment map M1 or extremely before a boundary line of the attribute region AR. Further, the subgoal point is able to be prevented from excessively expanding beyond the boundary line of the obstacle or the boundary line of the attribute region AR.

After the subgoal point (the expansion subgoal region) is expanded by a unit expansion area, the moving route generator 1443 determines whether the expansion subgoal region has reached the boundary line of the obstacle present on the environment map M1 or the boundary line of the attribute region AR (steps S433 to S434).

When the determination is made that the expansion subgoal region has not reached the boundary line of the obstacle on the environment map M1 nor the boundary line of the attribute region AR ("No" in step S433 and "No" in step S434), the moving route generator 1443 continues the expansion of the expansion subgoal region (namely, the process for generating a movable region returns to step S432).

On the other hand, when the determination is made that the expansion subgoal region has reached the boundary line of the obstacle on the environment map M1 or the boundary line of the attribute region AR ("Yes" in step S433 or "Yes" in step S434), the moving route generator 1443 stops the expansion of the expansion subgoal region.

After generating a new expansion region through addition of the currently generated expansion subgoal region, the moving route generator 1443 determines whether all the subgoal points included in the reference route SP are expanded (step S436).

When a subgoal point to be expanded is still present ("No" in step S436), the process for generating a movable region returns to step S431. As a result, expansion of a next subgoal point is started, so that a new expansion region is generated.

Figure 13:
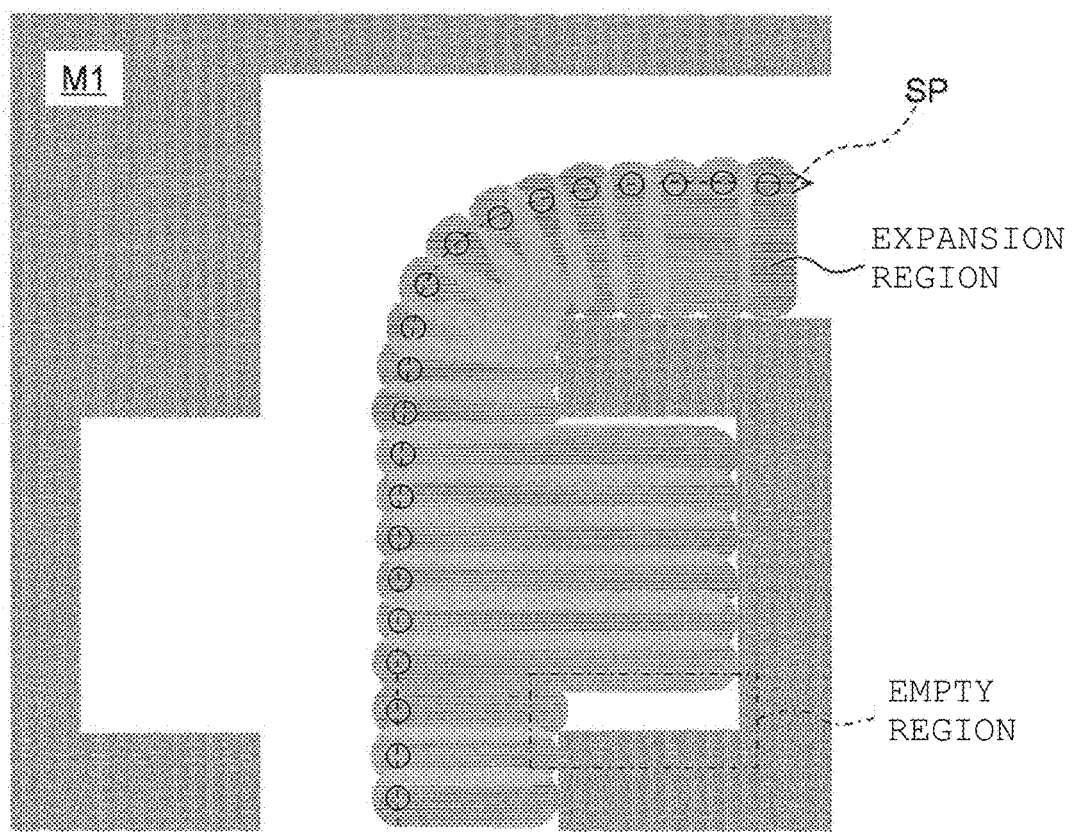
FIG. 13 is a diagram illustrating one example of an expansion region to be generated.

Upon execution of steps S431 to S436, in examples of the environment map M1 and the reference route SP illustrated in FIG. 10, when a value larger than about 50% is set for the widthwise-shift attribute (the shift percentage) on an entire region of the environment map M1 illustrated in FIG. 10, the reference route SP is expanded to the right side of a passage present on the environment map M1 with respect to the moving direction of the autonomous mobile body 1. As a result, the expansion region illustrated in FIG. 13 (the region with light color in FIG. 13) is generated. FIG. 13 is a diagram illustrating one example of an expansion region to be generated.

Figure 14A:
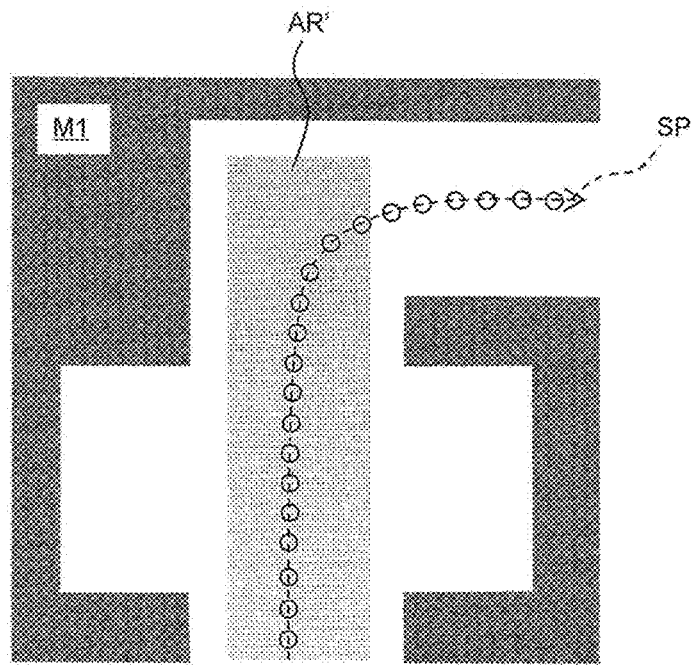
FIG. 14A is a diagram illustrating another setting example of an attribute region.
Figure 14B:
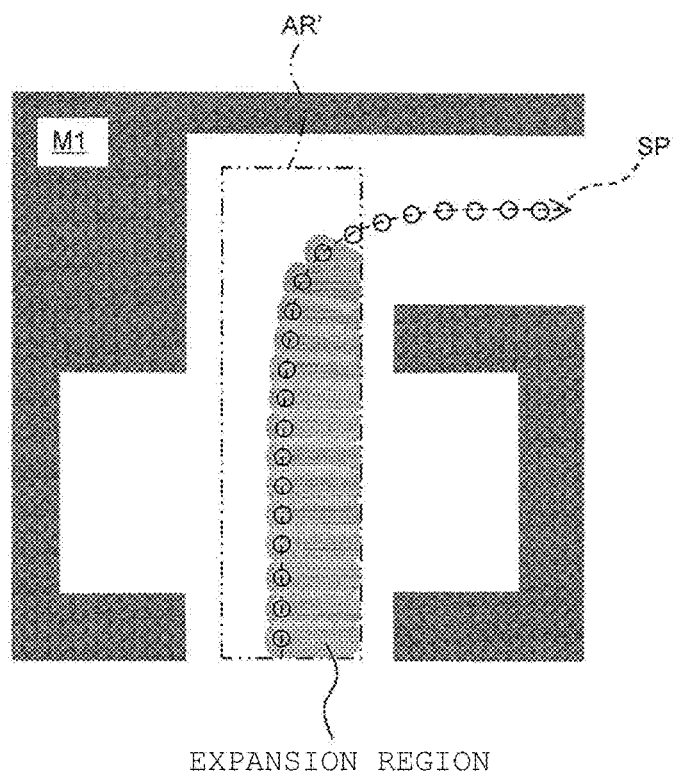
FIG. 14B is a diagram illustrating another example of an expansion region.

On the other hand, as illustrated in FIG. 14A, when the attribute region AR is set in the passage of the environment map M1 in the environment map M1 and the reference route SP illustrated in FIG. 10, the expansion subgoal region (the subgoal point) expands to the boundary line of the attribute region AR set in the passage as illustrated in FIG. 14B. FIG. 14A is a diagram illustrating another setting example of the attribute region. FIG. 14B is a diagram illustrating another example of the expansion region.

That is, respective subgoal points expand to a boundary line closer to the reference route SP, in the boundary line of the attribute region AR or the boundary line of the obstacle present in the environment map M1.

After steps S431 to S436 are executed on all the subgoal points ("Yes" in step S436), the moving route generator 1443 determines whether the reference route SP is appropriately expanded (step S437).

Figure 15:
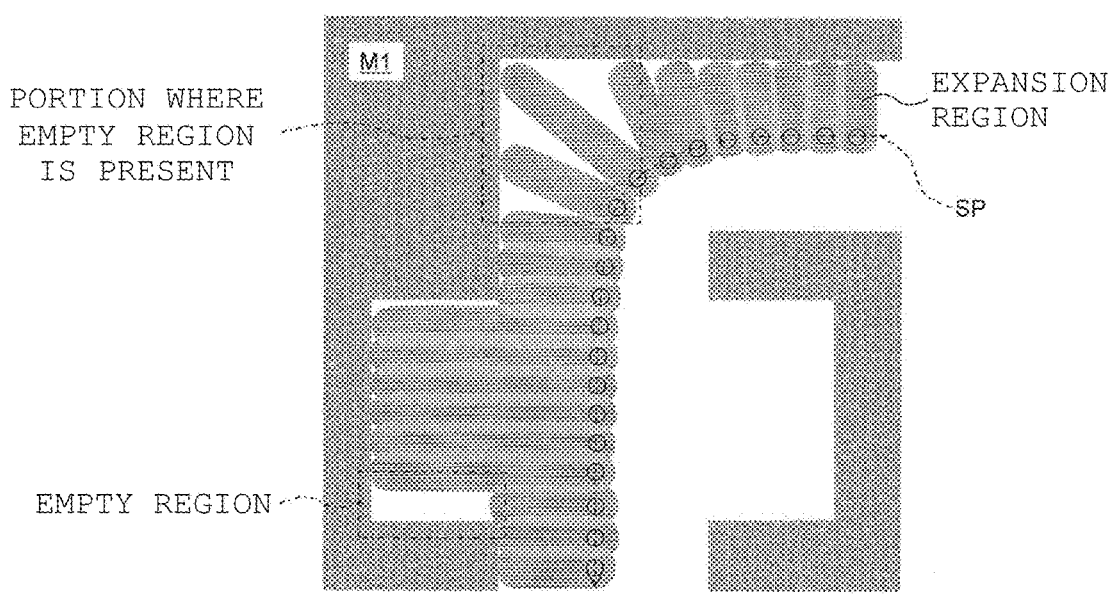
FIG. 15 is a diagram illustrating one example of a case where an empty region is generated.

Since the subgoal point (the expansion subgoal region) is expanded linearly in the expanding direction, for example, as illustrated in FIG. 13 and FIG. 15, at a portion where the passage width abruptly increases, the expansion of the expansion subgoal region stops at a corner of the portion of the passage width that abruptly changes. As a result, although there is a portion where an expansion region is to be present, a portion without an expansion region (an empty region) is generated.

Further, for example, as illustrated in FIG. 15, when the expansion subgoal region (the subgoal point) expands in an outer periphery direction of the reference route SP, an empty region is generated particularly on a curve portion of the reference route SP. FIG. 15 is a diagram illustrating one example of a case where an empty region is generated.

When such an empty region is present, the determination is made that the reference route SP is not appropriately expanded.

When the determination is made that an empty region is generated and the reference route SP is not appropriately expanded ("No" in step S437), the moving route generator 1443 executes the interpolation process for interpolating the empty region (step S438).

Specifically, the interpolation process is executed in a manner that an empty region is interpolated by disposing a predetermined region on the empty region and the region disposed for the interpolation is added to an expansion region generated by the Minkowski sum.

Figure 16:
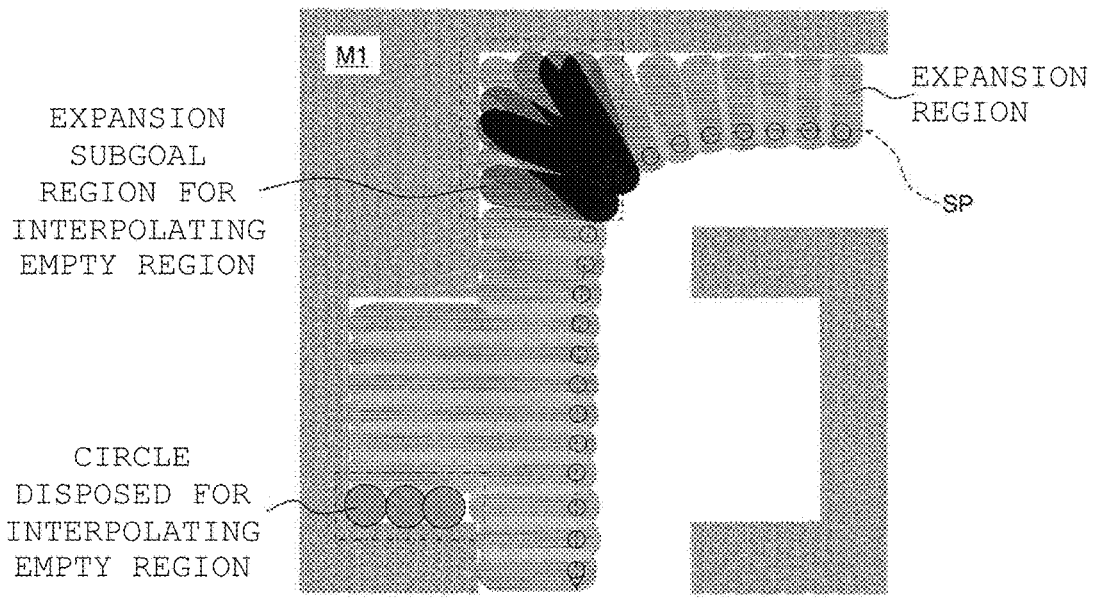
FIG. 16 is a diagram schematically illustrating one example of an interpolation process.

For example, as illustrated in FIG. 16, in the empty region generated at the portion where the passage width abruptly changes, circles having a radius corresponding to the size of the autonomous mobile body 1 are disposed in the number of circles that fill the empty region, so as to interpolate the empty region.

On the other hand, as an empty region that is generated on a curve portion of the reference route SP and has an expanding direction that is an outer peripheral direction, of subgoal points included in the curve portion, predetermined subgoal points are expanded in a plurality of directions so as to interpolate the empty region.

Specifically, for example, the predetermined subgoal points included in the curve portion are expanded not only in the expanding direction but also in a direction in which an angle is increased or decreased by 1° each within a predetermined angle range centering around the expanding direction, for example. FIG. is a diagram schematically illustrating one example of an interpolation process.

Figure 17:
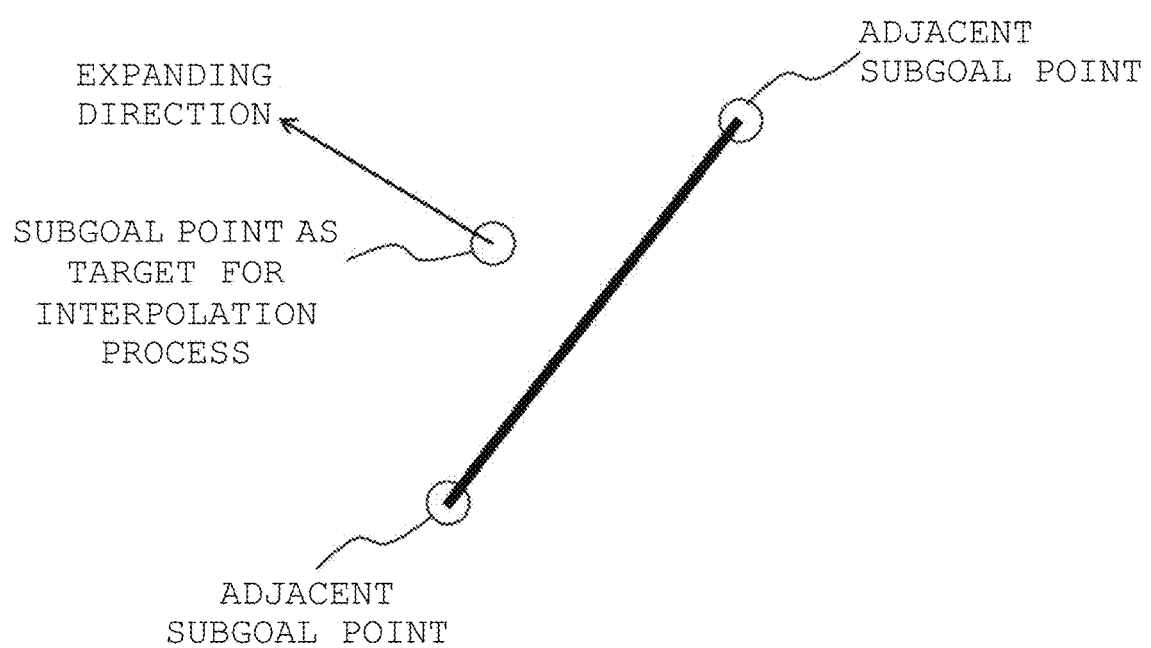
FIG. 17 is a diagram schematically illustrating one example of a method for deciding a subgoal point to be subjected to the interpolation process for expansion in a plurality of directions.

As to whether a subgoal point is to be subjected to the interpolation process, for example, as illustrated in FIG. 17, if the subgoal point to be determined as being subjected to the interpolation process is present on an expanding direction side (an external peripheral direction) with respect to a straight line that connects two adjacent subgoal points on both sides of the subgoal point, the determination is made that the interpolation process is executed on that subgoal point. FIG. 17 is a diagram schematically illustrating one example of a method for deciding subgoal points to be subjected to the interpolation process for expansion in a plurality of directions. Execution of the interpolation process enables generation of an appropriate movable region in which an empty region is not present.

On the other hand, when the determination is made that the expansion region without an empty region is appropriately generated by the expansion of the subgoal point through the Minkowski sum ("Yes" in step S437), a current expansion region is set as a movable region, and the process for generating a movable region is terminated.

When the movable region is generated by executing steps S431 to S438, a movable region, which is defined by the reference route SP and a moving boundary line (a boundary line that indicates a boundary to which the autonomous mobile body 1 is movable and that is present on a side indicated by the widthwise-shift attribute with respect to the reference route SP), is able to be appropriately generated in accordance with the method for expanding the reference route SP through the Minkowski sum.

Figure 18:
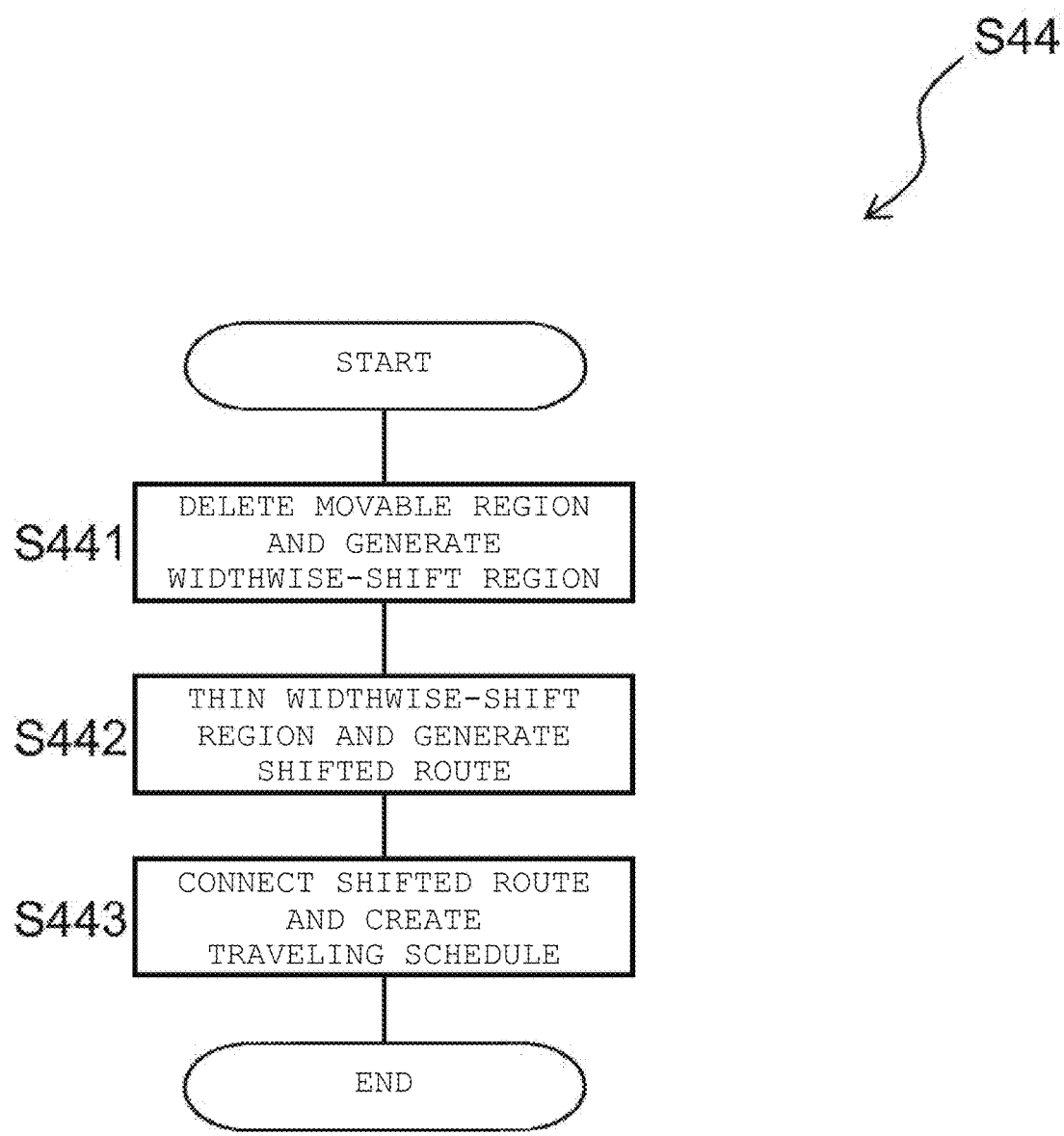
FIG. 18 is a flowchart illustrating a method for creating a traveling schedule.

A method for creating the traveling schedule TS in step S44 will be described in detail below with reference to FIG. 18. FIG. 18 is a flowchart illustrating a method for creating a traveling schedule.

First, the moving route generator 1443 deletes the movable region generated by executing step S43 (S431 to S438) in accordance with a shift percentage associated with an attribute map M3 (an attribute region AR) so as to generate a widthwise-shift capability region (step S441).

When the movable region is deleted, the moving route generator 1443 decides, based on a value of the shift percentage, whether the movable region is deleted from the reference route SP side or from a boundary line present on an opposite side from the reference route SP.

For example, when the shift percentage is larger than about 50% (the movable region is generated on a right side with respect to the moving direction of the autonomous mobile body 1) and the set shift percentage is smaller than about 75%, the movable region is decided to be deleted from the boundary line on the opposite side from the reference route SP.

The shift percentage being about 75% indicates that the reference route SP is shifted to an intermediate point between the reference route SP and the boundary line on the right side with respect to the moving direction.

Figure 19A:
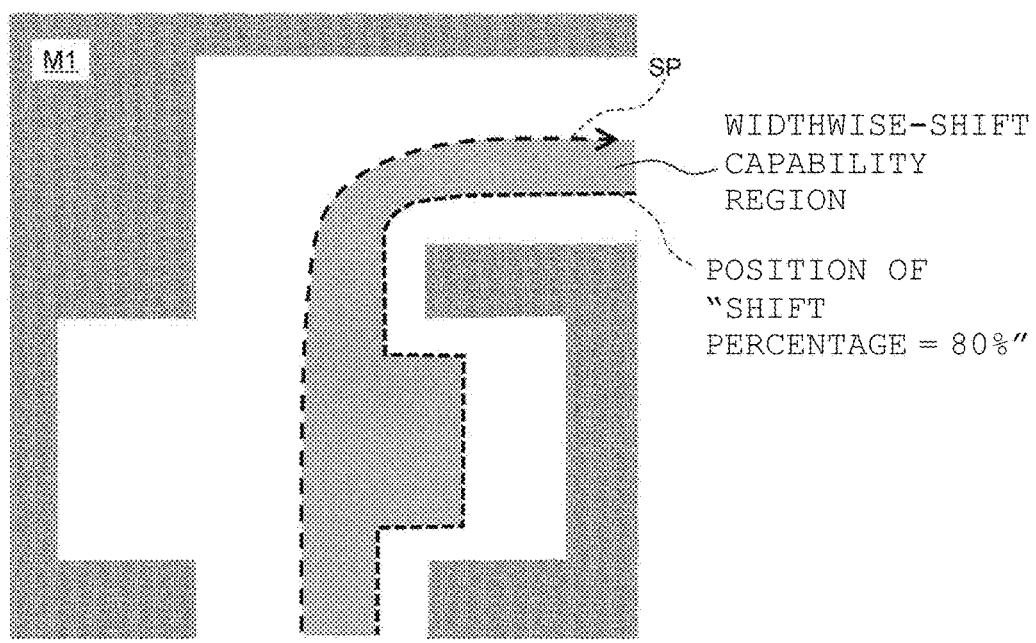
FIG. 19A is a diagram illustrating one example of a case where a widthwise-shift capability region is generated on a reference route side.

For example, when the shift percentage is set to about 65%, as illustrated in FIG. 19A, the movable region is deleted from the boundary line on the opposite side from the reference route SP to a position where the shift percentage is about 80% (when the shifted reference route is generated by a thinning process), so that a widthwise-shift capability region is generated.

FIG. 19A is a diagram illustrating one example of a case where a widthwise-shift capability region is generated on a reference route side.

On the other hand, when the shift percentage is larger than about 75%, the moving route generator 1443 decides to delete the movable region from the reference route SP side.

Figure 19B:
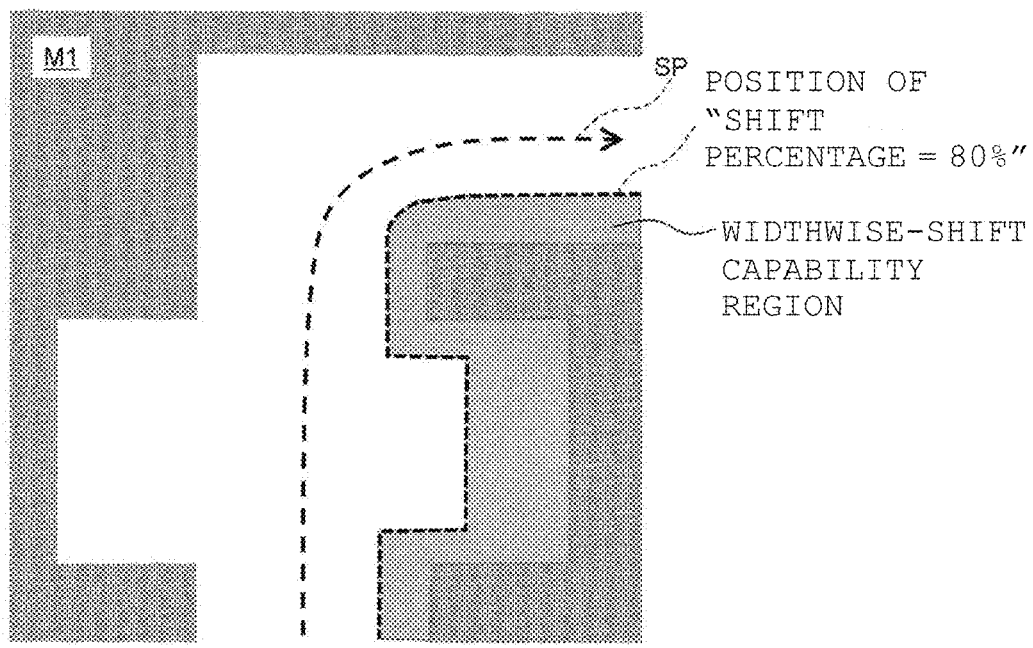
FIG. 19B is a diagram illustrating one example of a case where the widthwise-shift capability region is generated on an opposite side from the reference route.

For example, when the shift percentage is set to about 90%, as illustrated in FIG. 19B, the movable region is deleted from the reference route SP to the position where the shift percentage is about 80% (when the shifted reference route is generated by the thinning process), so that the widthwise-shift capability region is generated. FIG. 19B is a diagram illustrating one example of a case where the widthwise-shift capability region is generated on an opposite side from the reference route.

When the shift percentage is set to about 75%, the moving route generator 1443 executes the thinning process directly on the movable region (corresponding to generation of a line representing a middle of the movable region) so as to be capable of generating a route after the reference route SP is shifted (referred to as a shifted route).

On the other hand, when the shift percentage is smaller than about 50% (when the movable region is generated on a left side with respect to the moving direction) and is larger than about 25%, the movable region is deleted from the boundary line on the opposite side from the reference route SP so that a widthwise-shift capability region is generated. On the other hand, when the shift percentage is smaller than about 25%, the movable region is deleted from the reference route SP so that a widthwise-shift capability region is generated.

When the shift percentage is set to about 25%, the thinning process is executed directly on the movable region similarly to the case where the shift percentage is about 75%, so that a shifted route is able to be generated.

After generating the widthwise-shift capability region, the moving route generator 1443 executes the thinning process on the widthwise-shift capability region and generates a shifted route as a shift destination of the reference route SP (step S442).

Figure 20:
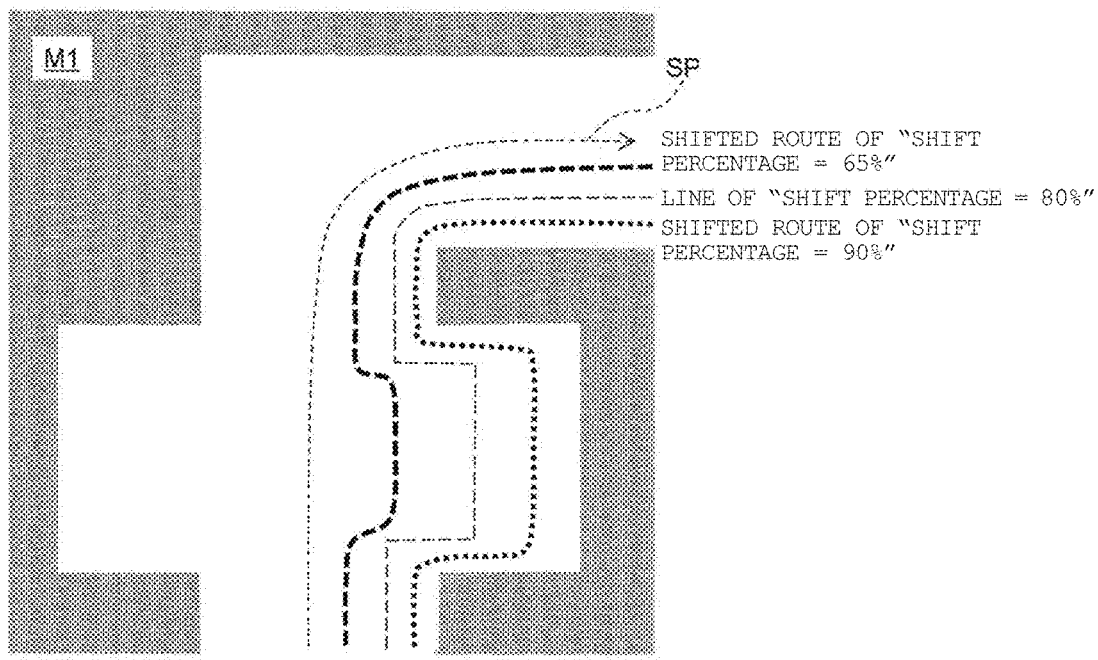
FIG. 20 is a diagram illustrating one example of a shifted route.

Specifically, as illustrated in FIG. 20, when the shift percentage is about 65%, namely, the widthwise-shift capability region generated by deleting the movable region from the boundary line on the opposite side from the reference route SP is subjected to the thinning process, the shifted route becomes a route generated at an intermediate point between the reference route SP and the line representing the position where the shift percentage is about 80%.

On the other hand, when the shift percentage is about 90%, namely, the widthwise-shift capability region that is generated by deleting the movable region from the reference route SP is subjected to the thinning process, the shifted route becomes a route that is generated at an intermediate point between a line representing the position where the shift percentage is about 80% and the boundary line on the opposite side from the reference route SP on the widthwise-shift capability region. FIG. 20 is a diagram illustrating one example of the shifted route.

A plurality of the attribute regions AR included in the attribute map M3 are typically isolated from each other, and have different widthwise-shift attributes (shift percentages). Therefore, the shifted routes generated for the respective attribute regions AR (and portions of the reference routes SP that are not shifted) in the above manner are isolated from each other so as to be discontinuous routes.

Therefore, after the shifted routes are generated, the moving route generator 1443 connects these discontinuous shifted routes each other and/or the portion of the reference route SP so as to create a traveling schedule TS as a continuous route (step S443).

In this preferred embodiment, the moving route generator 1443 continuously connects the two discontinuous shifted routes (or the portion of the reference route SP) through subgoal points generated by using a function (or a table) called "a smoothing table".

Figure 21:
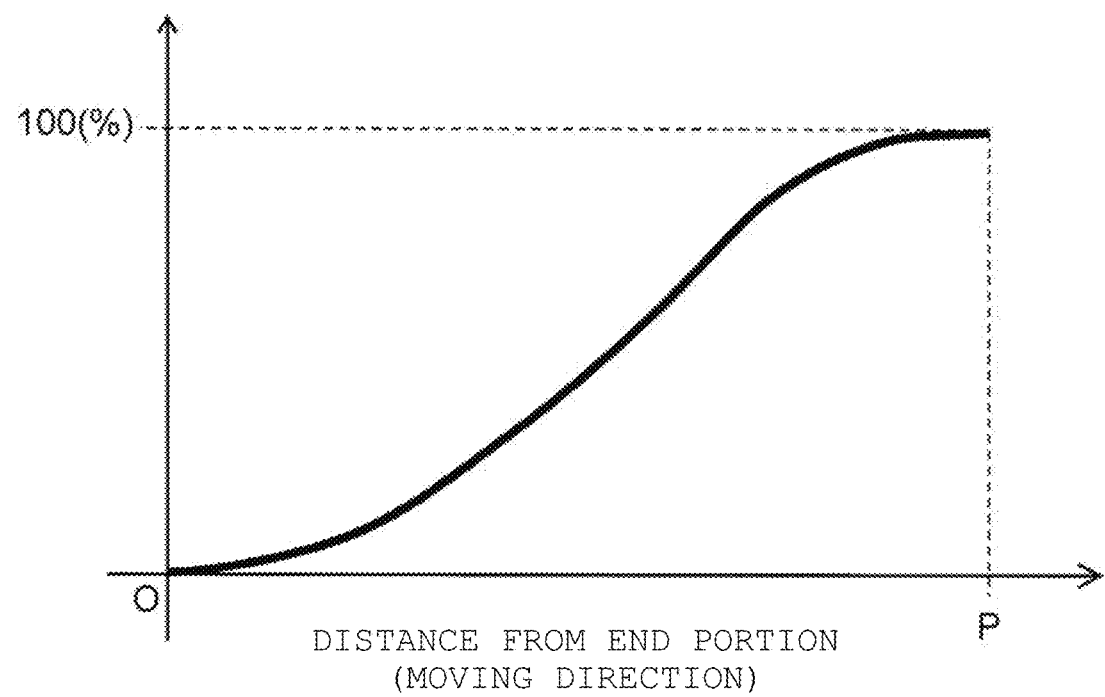
FIG. 21 is a diagram illustrating one example of a smoothing table.

The "smoothing table" represents a relationship between a distance from an end of one route to the moving direction of the autonomous mobile body 1 and a distance from a point, which advances from the end of the one route toward the moving direction of the autonomous mobile body 1 by a desired distance, to a direction vertical to the moving direction. For example, this table is expressed as a function illustrated in FIG. 21. FIG. 21 is a diagram illustrating one example of the smoothing table.

In an example of the smoothing table illustrated in FIG. 21, a distance from the point, which advances from the end of the one route toward the moving direction of the autonomous mobile body 1 by a desired distance, to the direction vertical to the moving direction is represented as a percentage when a distance from a point, which advances from the end of the one route toward the moving direction by a smoothing distance P, to the other route is 100%.

The smoothing table can be, for example, expressed by a sigmoid function $(Y=(1+\exp(-\gamma*X))^{-1}$, X: a horizontal axis, Y: a vertical axis, and $\gamma$: a positive constant).

Figure 22:
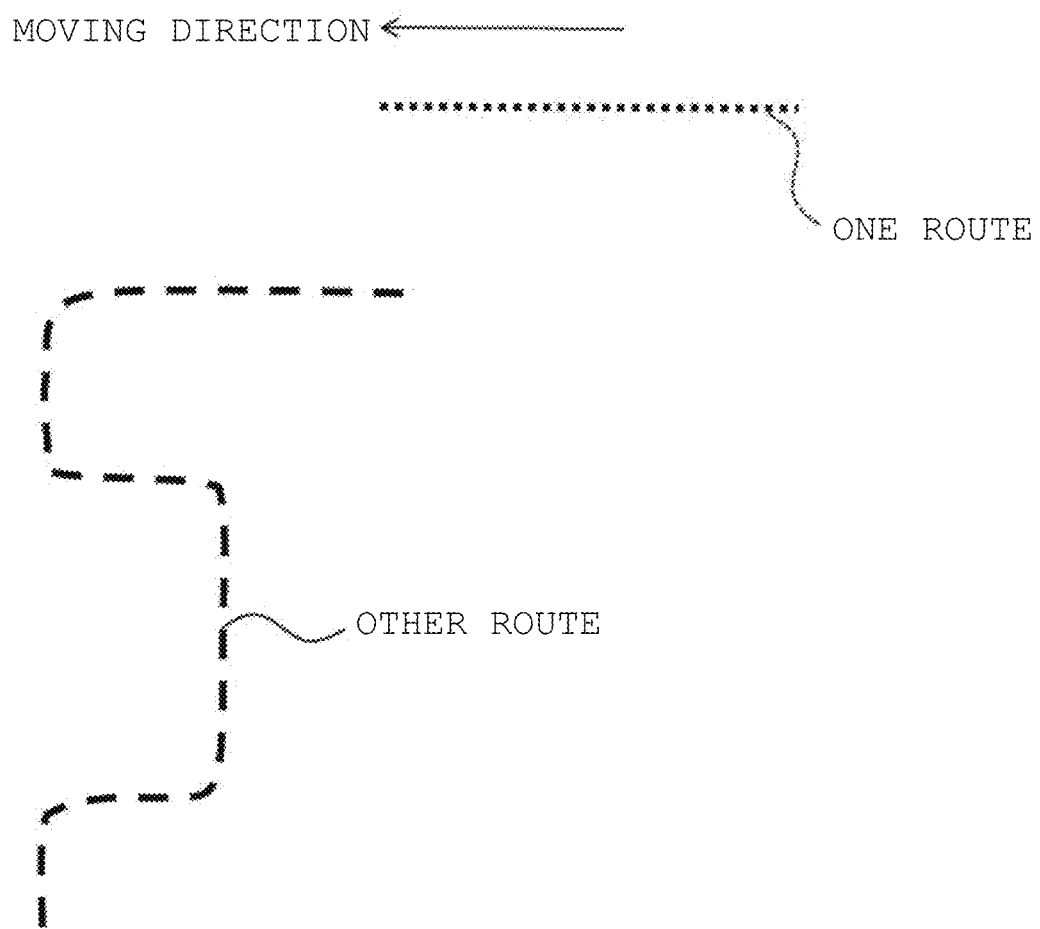
FIG. 22 is a diagram illustrating one example of two discontinuous routes isolated from each other.

A case where two discontinuous routes illustrated in FIG. 22 are connected will be described below with reference to the "smoothing table". FIG. 22 is a diagram illustrating one example of two discontinuous routes isolated from each other.

The moving route generator 1443 first decides two connecting points that connect the two discontinuous routes.

One of the two connecting points (referred to as a first connecting point) is set as a subgoal point at an end of the one route, of the two discontinuous routes, on the other route side to be connected.

Figure 23:
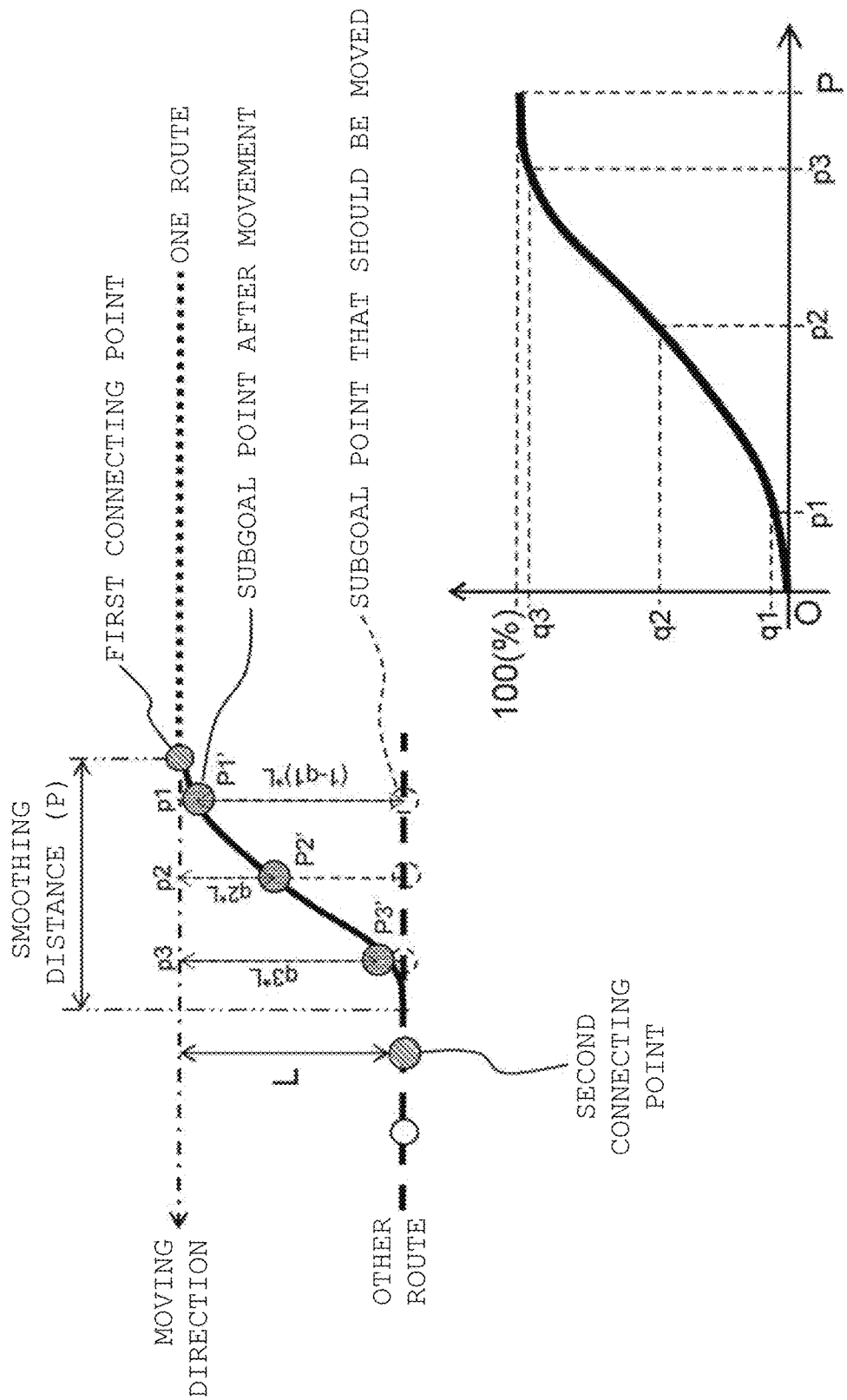
FIG. 23 is a diagram illustrating one example of a method for connecting the two discontinuous routes.

On the other hand, the other connecting point (referred to as a second connecting point) is set, as illustrated in FIG. 23, as a subgoal point which is present on a side (included in the other route) further toward the moving direction from an intersection between the other route and a vertical line drawn down from the point, which advances from the first connecting point toward the moving direction by the smoothing distance P, vertically to the moving direction. The smoothing distance P can be decided based on, for example, how far the two routes desired to be connected are separated from each other.

FIG. 23 is a diagram illustrating one example of a method for connecting the two discontinuous routes.

After setting the two connecting points (the first connecting point and the second connecting point), the moving route generator 1443 decides a distance corresponding to "100%" on the vertical axis of the smoothing table (the moving direction is a distance toward a vertical direction). In this preferred embodiment, as illustrated in FIG. 23, a distance L between the second connecting point and a straight line obtained by extending one route to the moving direction is decided as a distance corresponding to "100%".

Then, of the subgoal points included in the other route, a subgoal point that should be moved in order to easily connect the first connecting point and the second connecting point is decided. In this preferred embodiment, of the subgoal points included in the other route, subgoal points, which are present on an opposite side of the moving direction from the second connecting point (a side close to the first connecting point), are decided to be moved (in the example illustrated in FIG. 23, three subgoal points indicated by dotted circles).

Further, the moving route generator 1443 calculates intersections between vertical lines drawn from the subgoal points decided to be moved vertically to the moving direction and straight lines extended from the one route, and distances from the intersections to the first connecting point. In the example illustrated in FIG. 23, the distances from the intersections to the first connecting point are assumed to be calculated as p1, p2, and p3 respectively.

The moving route generator 1443 then decides positions to which the subgoal points decided to be moved are moved. Specifically, as illustrated in FIG. 23, the subgoal point corresponding to the intersection whose distance from the first connecting point is p1 is decided to be moved vertically to the moving direction by a distance of $(1-q1)*L (0<q1<1)$. The subgoal point corresponding to the intersection whose distance from the first connecting point is p2 is decided to be moved vertically to the moving direction by a distance of $(1-q2)*L (0<q2<1)$. Further, the subgoal point corresponding to the intersection whose distance from the first connecting point is p3 is decided to be moved vertically to the moving direction by a distance of $(1-q3)*L (0<q3<1)$.

Symbols q1, q2, and q3 denote values on the vertical axis of the smoothing table when the horizontal axis of the smoothing table has values p1, p2, and p3.

When the two discontinuous routes isolated from each other are connected in the above manner, a new route that is obtained by continuously connecting the two discontinuous routes is able to be created as the traveling schedule TS.

The following description refers to effects of creating a traveling schedule TS from a reference route SP, based on a widthwise-shift attribute (a shift percentage) associated with an attribute map M3 (an attribute region AR) independent from an environment map M1.

Firstly, the attribute map M3 is made to be separated from the environment map M1 so that the traveling schedule TS that is not influenced by a passage width of the environment map M1 is able to be created.

Figure 24:
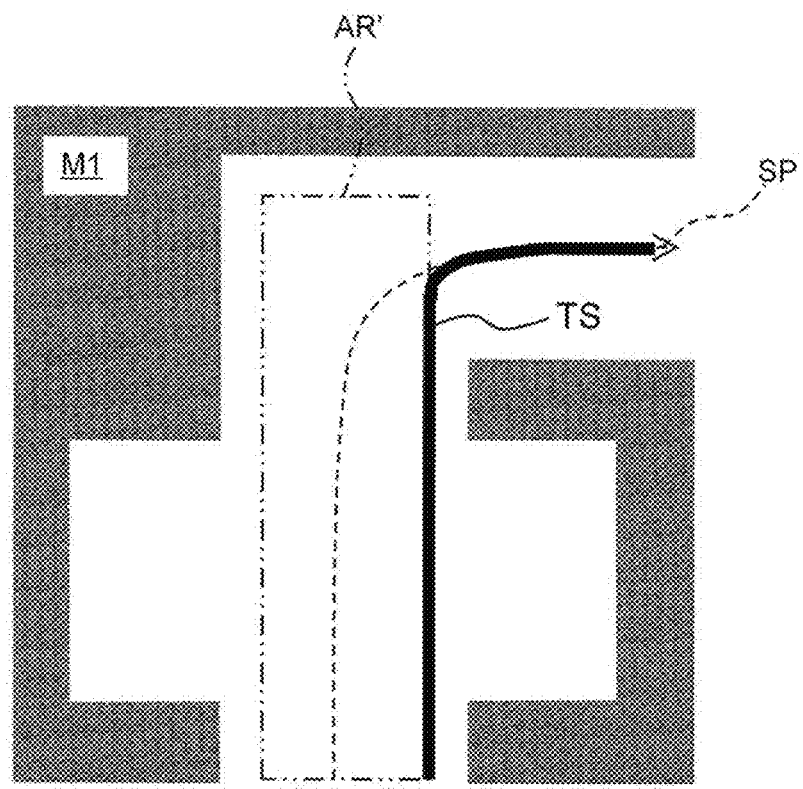
FIG. 24 is a diagram illustrating one example of a traveling schedule (the shifted route) created when an attribute region narrower than a passage width is set.

For example, when a shift percentage of 100% is associated with the attribute region AR at a portion where, as illustrated in FIG. 15A, and the attribute region AR narrower than a passage width is set, the traveling schedule TS (a shifted route) illustrated in FIG. 24 can be created. That is, the traveling schedule TS (the shifted route) is created on a boundary line of the attribute region AR.

FIG. 24 is a diagram illustrating one example of the traveling schedule (the shifted route) created when the attribute region narrower than the passage width is set.

As illustrated in FIG. 24, even when the passage width present on the environment map M1 changes in the middle of the traveling schedule TS, the traveling schedule TS is not influenced by the change in the passage width.

Secondly, the traveling schedule TS is able to be created appropriately so that two autonomous mobile bodies 1 set, on the reference route SP, to move in opposite directions on one route do not collide with each other.

Figure 25:
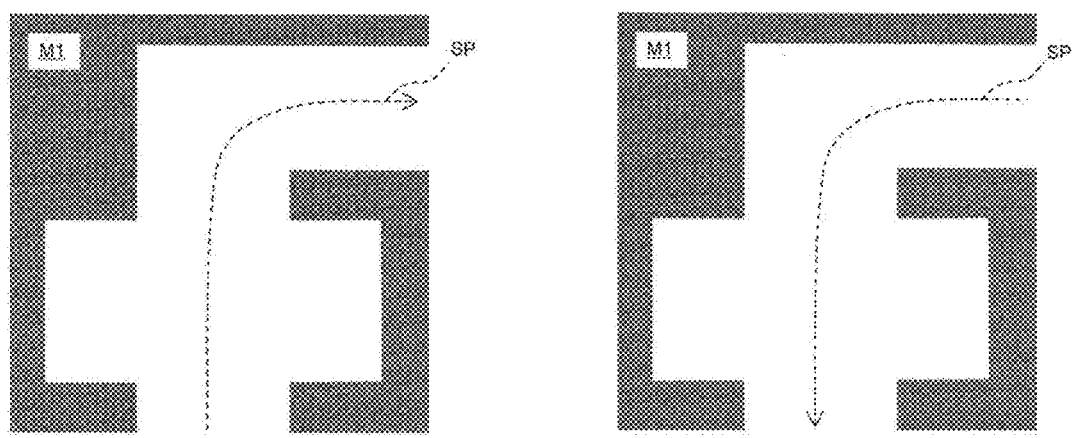
FIG. 25 is a diagram illustrating one example of two reference routes for movement in opposite directions on one route.

For example, as illustrated in FIG. 25, the two reference routes SP are assumed to be set for the two autonomous mobile bodies 1 which move in opposite directions on one route, respectively. Further, one attribute region AR is assumed to be set on a region of the environment map M1 (a shift percentage (a widthwise-shift attribute) with a value of about 90% is assumed to be associated with an entire region of the environment map M1 illustrated in FIG. 25).

FIG. 25 is a diagram illustrating one example of two reference routes for movement in opposite directions on one route.

Figure 26:
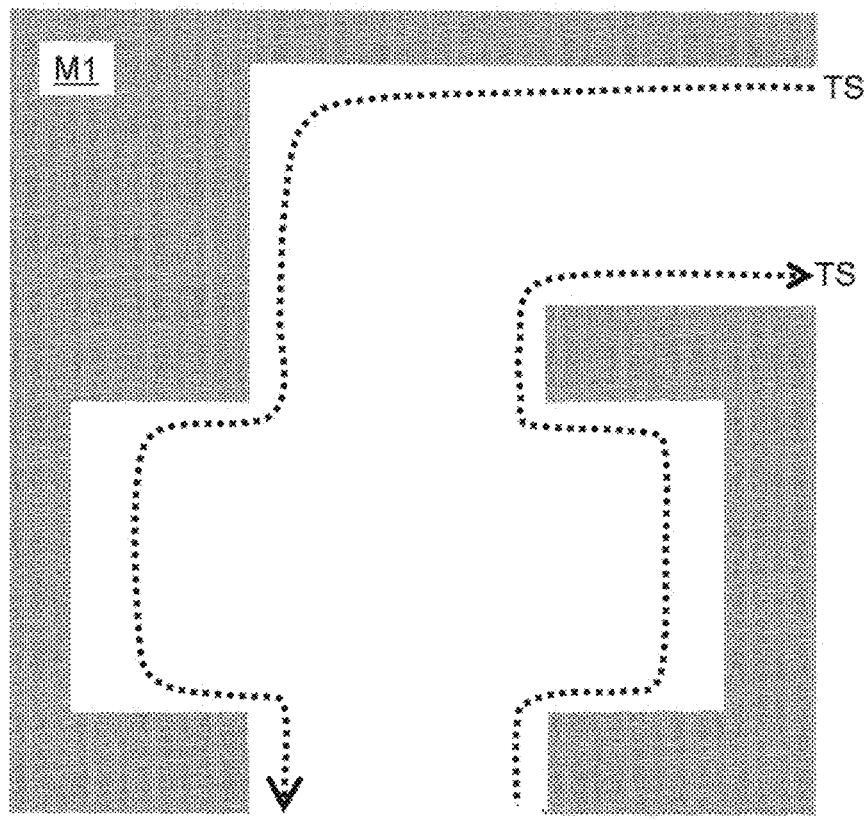
FIG. 26 is a diagram illustrating one example of the traveling schedules generated from the reference route for the movement in opposite directions on one route.

In this case, when the traveling schedule TS is created by the method described above using one attribute region AR (one attribute map M3) independent from the environment map M1, as illustrated in FIG. 26, two different traveling schedules TS that do not overlap with each other are able to be created for two reference routes SP (two autonomous mobile bodies 1) that move in opposite directions on one route. That is, the traveling schedules TS that enable the two autonomous mobile bodies 1 to move in opposite directions without collision are able to be created for the autonomous mobile bodies 1 respectively.

FIG. 26 is a diagram illustrating one example of the traveling schedules generated from the reference route for the movement in opposite directions on one route.

OTHER PREFERRED EMBODIMENTS

Preferred embodiment of the present invention have been described above, but the present invention is not limited to the above preferred embodiments and can be variously modified within a range without deviating from the gist of the present invention. Particularly, the plurality of preferred embodiments and the alternative preferred embodiments described in this specification can be freely combined as necessary.

In the first preferred embodiment, the environment map M1 preferably is created based on information (a local map M2) acquired when the autonomous mobile body 1 is moved. However, the present invention is not limited thereto, and similarly to an attribute map M3, an environment map M1 may be created by using a CAD and/or drawing software, and may be converted into data so as to be used in the autonomous mobile body 1.

As a result, the autonomous mobile body 1 does not need to be moved in order to generate an environment map M1.

The function of the moving route creator 144 may be realized by another external computer system or the like different from the controller 14 of the autonomous mobile body 1. In this case, the other computer system is the moving route creating device 100.

Further, when an environment map M1 and/or a reference route SP are generated by moving the autonomous mobile body 1 in the manual mode, the other computer system may acquire an environment map M1 and/or a reference route SP from the controller 14 of the autonomous mobile body 1 via a network.

When the function of the moving route creator 144 is realized by other computer systems, different traveling schedules TS are able to be created while the autonomous mobile body 1 is being moved in the autonomous mode.

A boundary line of a prohibition area may be used as criteria to decide a boundary line of a movable region. The prohibition area represents, for example, a position of an obstacle present on a passage (a pillar of a building, a shelf placed on a floor, or the like) as a region defined in a movement coordinate system.

In a case where the prohibition area is used as criteria to decide a boundary line of a movable region, expansion of expansion subgoal region (a subgoal point) is stopped not only when the expansion subgoal region reaches a boundary line of an obstacle present on an environment map M1 or a boundary line of an attribute region AR but also when the expansion subgoal region reaches a boundary line of the prohibition area, during the expansion of the expansion subgoal region in an expanding direction.

When the prohibition area is used as a criterion to decide a boundary line of a movable region, for example, a traveling schedule TS that avoids an obstacle on a passage present on an environment map M1 is able to be created.

A widthwise-shift attribute may be defined as a parameter representing a moving direction of a reference route SP, and a shift percentage may be defined as a parameter representing an amount of widthwise-shift from the reference route SP so that the widthwise-shift attribute and the shift percentage may be defined as individual parameters.

When a widthwise-shift attribute and a shift percentage are defined as individual parameters, the moving direction of the reference route SP and the widthwise-shift amount of the reference route SP is able to be managed in a clearly distinguished manner.

The mobile unit 12 provided to the autonomous mobile body 1 may have a configuration different from a configuration of a differential two-wheel mobile body such as an omni-wheel mobile body that is able to move omni-directionally.

A widthwise-shift amount of a reference route SP is calculated by a product of a distance from the reference route SP to a boundary line on an opposite side of a movable region from the reference route SP and a shift percentage. The reference route SP (or respective subgoal points) is shifted to the right or left by the widthwise-shift amount, so that a traveling schedule TS (a shifted route) may be created.

As a result, the traveling schedule TS (the shifted route) is able to be created by single calculation.

Preferred embodiments of the present invention can be widely applied to devices that use the method for creating a moving route of a mobile body that moves in a predetermined mobile environment and a method for creating the moving route.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A moving route creating method comprising:
   creating a reference route on a passage present on an environment map representing an environment in which an autonomous mobile body moves, the reference route being a route that is a reference on which the autonomous mobile body moves;
   setting a widthwise-shift attribute by a user as an attribute region that is independent from the environment map, the widthwise-shift attribute defining movement of the autonomous mobile body right or left from the reference route with respect to a moving direction; and
   creating a moving route along which the autonomous mobile body autonomously moves by shifting the reference route right or left based on the widthwise-shift attribute; wherein
   the widthwise-shift attribute includes, as a parameter, a shift percentage representing a percentage of a right shift or a left shift from the reference route; and
   the creating the moving route includes:
      generating a movable region defined by the reference route and a moving boundary line as a boundary line representing a boundary to which the autonomous mobile body is movable, the moving boundary line being present on a side indicated by the widthwise-shift attribute with respect to the reference route;
      generating a widthwise-shift capability region by deleting, from the movable region, a side to be decided based on the shift percentage as a parameter representing a percentage of the right shift or the left shift from the reference route; and
      creating the moving route by executing a thinning process on the widthwise-shift capability region.

2. The moving route creating method according to claim 1, wherein the generating the movable region includes:
   generating an expansion region by expanding the reference route in a direction indicated by the widthwise-shift attribute in accordance with a Minkowski sum; and
   executing, when an empty region without the expansion region is present in a region where the expansion region is to be present in the passage present on the environment map, an interpolation process to interpolate the empty region with a predetermined region.

3. The moving route creating method according to claim 1, wherein the generating the movable region includes:
   generating an expansion region by expanding the reference route in a direction indicated by the widthwise-shift attribute in accordance with a Minkowski sum; and
   executing, when an empty region without the expansion region is present in a region where the expansion region is to be present in the passage present on the environment map, an interpolation process to interpolate the empty region with a predetermined region.

4. A moving route creating device comprising:
   a controller; and
   a storage; wherein the controller creates a reference route on a passage present on an environment map representing an environment in which an autonomous mobile body moves, the reference route being a route that is a reference on which the autonomous mobile body moves;

the storage stores an attribute map created by a user to set a widthwise-shift attribute as an attribute region, the widthwise-shift defining movement of the autonomous mobile body right or left from the reference route with respect to a moving direction, the attribute map being independent from the environment map;

the controller creates a moving route along which the autonomous mobile body autonomously moves by shifting the reference route right or left based on the widthwise-shift attribute;

the widthwise-shift attribute includes, as a parameter, a shift percentage representing a percentage of a right shift or a left shift from the reference route; and to create the moving route, the controller:
  generates a movable region defined by the reference route and a moving boundary line as a boundary line representing a boundary to which the autonomous mobile body is movable, the moving boundary line being present on a side indicated by the widthwise-shift attribute with respect to the reference route;
  generates a widthwise-shift capability region by deleting, from the movable region, a side to be decided based on the shift percentage as a parameter representing a percentage of the right shift or the left shift from the reference route; and
  creates the moving route by executing a thinning process on the widthwise-shift capability region.

5. The moving route creating device according to claim 4, further comprising a display; wherein
  the display displays at least a portion of the environment map;
  the controller draws a region with a predetermined shape on at least the portion of environment map displayed on the display; and
  the controller generates the attribute region by associating the widthwise-shift attribute with the region with the predetermined shape drawn by the controller.

6. The moving route creating device according to claim 5, wherein
  the controller colors the region with the predetermined shape; and
  the controller generates the attribute region by calculating, based on a coloring density within the region with the predetermined shape, the shift percentage representing the percentage of the right shift or the left shift from the reference route, and associating the widthwise-shift attribute including the shift percentage with the region with the predetermined shape.

7. The moving route creating method according to claim 1, wherein the environment map includes a position of a structure included in the environment in which the autonomous mobile body moves.

8. The moving route creating method according to claim 7, further comprising:
  estimating a plurality of self-positions of the autonomous mobile body at predetermined time intervals when the autonomous mobile body moves in a manual mode in which the autonomous mobile body is moved through operation by the user;
  acquiring a plurality of local maps which correspond to the plurality of estimated self-positions;
  disposing the plurality of local maps on coordinates of the plurality of estimated self-positions in a movement coordinate system in order to create the environment map; and
  storing the environment map.

9. The moving route creating device according to claim 4, wherein the environment map includes a position of a structure included in the environment in which the autonomous mobile body moves.

10. The moving route creating device according to claim 9, wherein
  the controller estimates a plurality of self-positions of the autonomous mobile body at predetermined time intervals when the autonomous mobile body moves in a manual mode in which the controller moves the autonomous mobile body through operation by the user;
  the controller acquires a plurality of local maps which correspond to the plurality of estimated self-positions;
  the controller disposes the plurality of local maps on coordinates of the plurality of estimated self-positions in a movement coordinate system in order to create the environment map; and
  the storage stores the environment map.

* * * * *